US011333914B2

(12) United States Patent
Inoue et al.

(10) Patent No.: US 11,333,914 B2
(45) Date of Patent: *May 17, 2022

(54) ELECTRO-OPTICAL DEVICE AND ELECTRONIC EQUIPMENT

(71) Applicant: Japan Display Inc., Tokyo (JP)

(72) Inventors: Kaoru Inoue, Tokyo (JP); Hiromichi Tanaka, Tokyo (JP); Takeshi Kaneki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/375,509

(22) Filed: Jul. 14, 2021

(65) Prior Publication Data

US 2021/0341781 A1 Nov. 4, 2021

Related U.S. Application Data

(63) Continuation of application No. 16/812,426, filed on Mar. 9, 2020, now Pat. No. 11,106,066.

(30) Foreign Application Priority Data

Mar. 11, 2019 (JP) .............................. JP2019-043335

(51) Int. Cl.
*G02F 1/1333* (2006.01)
*G02F 1/1335* (2006.01)
*G02F 1/1368* (2006.01)

(52) U.S. Cl.
CPC ...... *G02F 1/133308* (2013.01); *G02F 1/1368* (2013.01); *G02F 1/133512* (2013.01); *G02F 1/133514* (2013.01); *G02F 1/133528* (2013.01)

(58) Field of Classification Search
None
See application file for complete search history.

(56) References Cited

U.S. PATENT DOCUMENTS

2012/0105400 A1 5/2012 Mathew et al.
2013/0177302 A1 7/2013 Weber
(Continued)

FOREIGN PATENT DOCUMENTS

CN 108990336 A 12/2018
JP 2012-098726 A 5/2012
JP 2017-142497 A 8/2017

OTHER PUBLICATIONS

English Translation of CN-108990336-A, Title: Electronic Device, Author: Tang Yimei; Cheng Jiao; Liu Min; Ouyang Zhibin; Date of publication: Dec. 11, 2018 (Year: 2018).

*Primary Examiner* — Shan Liu
(74) *Attorney, Agent, or Firm* — Oblon, McClelland, Maier & Neustadt, L.L.P.

(57) ABSTRACT

A display device which is an electro-optical device includes a panel including a first substrate, a second substrate, and a liquid crystal layer and having a display region, a transparent region provided inside the display region, and a frame region provided between the transparent region and the display region. A backlight unit is provided below the panel so as not to overlap with the transparent region. A bezel is provided below the backlight unit so as not to overlap with the transparent region. A cover member is provided above the second substrate so as to overlap with the transparent region. Also, a cap film made of a material different from that of the bezel covers at least a lateral side of the backlight unit in the frame region.

12 Claims, 25 Drawing Sheets

(56) References Cited

U.S. PATENT DOCUMENTS

| | | |
|---|---|---|
| 2016/0011633 A1 | 1/2016 | Watanabe |
| 2017/0090113 A1 | 3/2017 | Yuki |
| 2017/0153488 A1 | 6/2017 | Shin |
| 2017/0187934 A1 | 6/2017 | Kwak et al. |
| 2017/0289694 A1 | 10/2017 | Choi |
| 2019/0072822 A1 | 3/2019 | Yasunaga |
| 2020/0064681 A1 | 2/2020 | Son |
| 2020/0186688 A1 | 6/2020 | Chen |
| 2020/0192148 A1 | 6/2020 | Kim |
| 2020/0241358 A1* | 7/2020 | Inui .................. G02F 1/133528 |

* cited by examiner

B-B CROSS SECTION

B-B CROSS SECTION

B-B CROSS SECTION

B-B CROSS SECTION

B-B CROSS SECTION

B-B CROSS SECTION

B-B CROSS SECTION

B-B CROSS SECTION

ELECTRO-OPTICAL DEVICE AND ELECTRONIC EQUIPMENT

CROSS-REFERENCE TO RELATED APPLICATION

The present application is a continuation of U.S. application Ser. No. 16/812,426 filed Mar. 9, 2020, and claims priority from Japanese Patent Application No. 2019-043335 filed on Mar. 11, 2019, the content of each of which is hereby incorporated by reference into this application.

TECHNICAL FIELD OF THE INVENTION

The present invention relates to an electro-optical device, for example, an electro-optical device having a transparent region which does not overlap with a pixel in a display region. Alternatively, the present invention relates to an electronic equipment in which an electro-optical device having a transparent region which does not overlap with a pixel in a display region is incorporated.

BACKGROUND OF THE INVENTION

Patent document 1 (Japanese Patent Application Laid-Open Publication No. 2017-142497) discloses a technology in which a hole for a camera is formed in a glass serving as a cover member and an optical barrier peripheral portion made of a thin metal film is formed on an inner wall of the hole.

Patent document 2 (Japanese Patent Application Laid-Open Publication No. 2012-98726) discloses a technology in which a hole is formed in a first substrate serving as a transistor layer and a second substrate serving as a color filter layer, a part of the transistor layer is made to project toward the hole, and a transparent embedding layer is formed between the projecting portion and a cover member.

Patent document 3 (US Patent Application Publication No. 2017/0187934) discloses a technology in which a metal pattern of the same layer as a gate electrode is formed in the vicinity of a hole in which a camera module is mounted.

SUMMARY OF THE INVENTION

In recent years, in an electronic equipment using an electro-optical device such as a display device having a panel including a liquid crystal layer or the like, an electronic component such as a camera module or a sensor module is mounted in the electro-optical device. For example, in an electro-optical device including a camera module, the camera module is provided at a position surrounded by a backlight unit provided below a panel in some cases. Thus, light emitted from the backlight unit leaks toward the camera module, which causes a problem of the degradation of characteristics of the camera. Therefore, a technology capable of improving the performance of the electro-optical device by addressing the above-mentioned light leakage is desired.

Other problems and novel features will be apparent from the description of the present specification and the accompanying drawings.

An electro-optical device according to an embodiment comprises a panel including a first substrate, a second substrate provided above the first substrate, and an electro-optical layer formed between the first substrate and the second substrate and having a display region. Also, the electro-optical device comprises a transparent region provided inside the display region in a plan view, a frame region provided between the transparent region and the display region in a plan view, and a backlight unit provided below the first substrate of the panel so as not to overlap with the transparent region in a plan view. In addition, the electro-optical device comprises a bezel provided below the backlight unit so as not to overlap with the transparent region in a plan view, a cover member provided above the second substrate of the panel so as to overlap with the transparent region in a plan view, and a cap configured to cover at least a lateral side of the backlight unit in the frame region and made of a material different from that of the bezel.

BRIEF DESCRIPTIONS OF THE DRAWINGS

DESCRIPTIONS OF THE PREFERRED EMBODIMENTS

Figure 1:
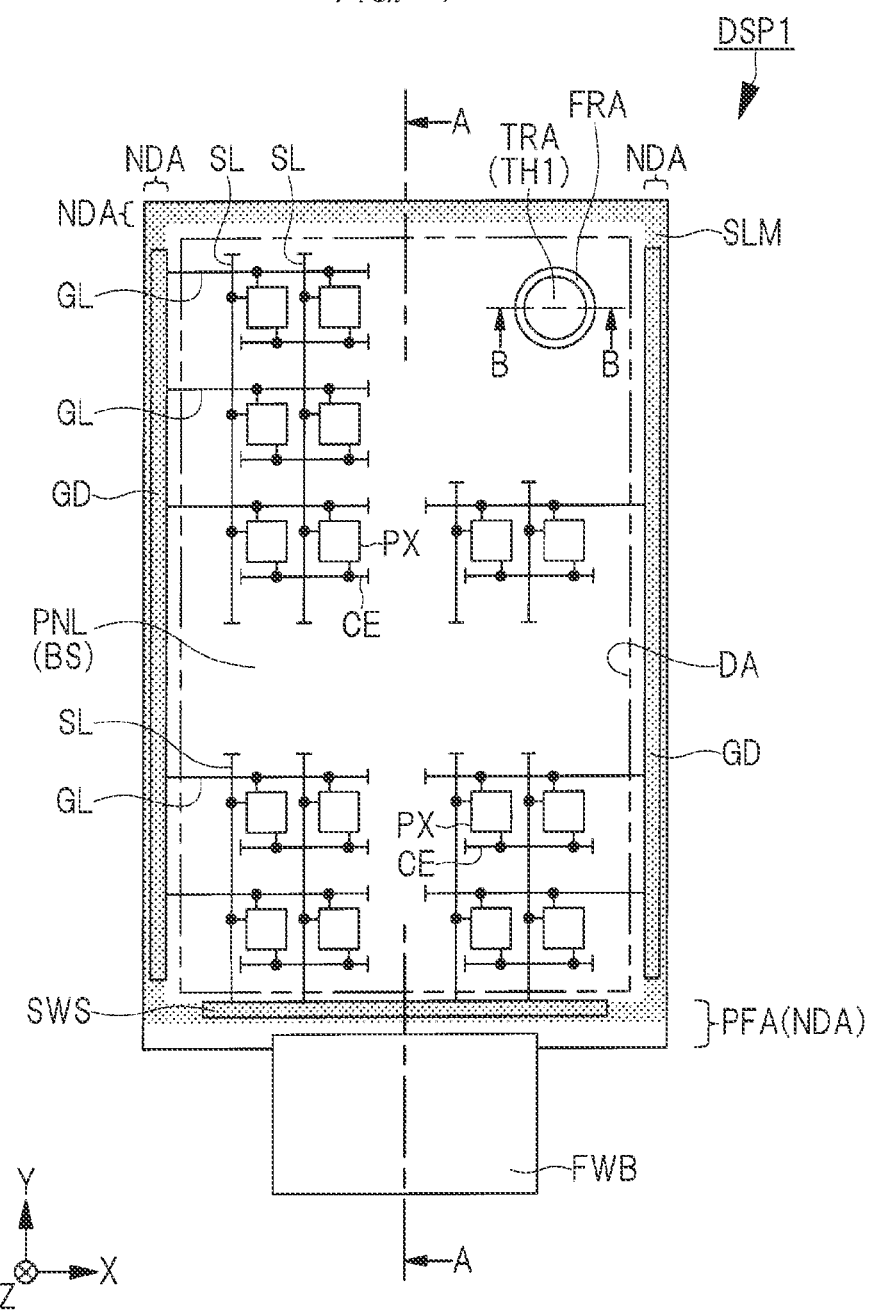
FIG. 1 is a bottom view showing a display device according to a first embodiment.

Hereinafter, embodiments of the present invention will be described in detail with reference to the accompanying drawings. Note that the disclosure is mere an example, and it is a matter of course that any alteration that is easily made by a person skilled in the art while keeping a gist of the present invention is included in the present invention. In addition, the drawings schematically illustrate a width, a thickness, a shape and the like of each portion as compared to actual aspects in order to make the description clearer, but the drawings are mere examples and do not limit the interpretation of the present invention. Further, the same or related reference characters are applied to the same elements as those described in relation to the foregoing drawings in the present specification and the respective drawings, and detailed descriptions thereof will be appropriately omitted in some cases.

First Embodiment

Hereinafter, a display device on which various images are displayed in a display region will be described as an electro-optical device having a panel including an electro-optical layer such as a liquid crystal layer. Note that, in this embodiment, a display device used in a smartphone or a tablet terminal will be mainly described, but the electro-optical device includes a shutter liquid crystal element for controlling the light transmission used for a rearview mirror of a vehicle or the like.

Also, the display devices including the liquid crystal layer are broadly classified into the following two groups depending on the direction of application of an electric field for changing the alignment of liquid crystal molecules of the liquid crystal layer. Namely, the first group is the so-called vertical field mode in which electric field is applied in a thickness direction of the display device or an out-of-plane direction of the display surface. The vertical field mode includes, for example, the TN (Twisted Nematic) mode and the VA (Vertical Alignment) mode. Also, the second group is the so-called transverse field mode in which electric field is applied in a planar direction of the display device or an in-plane direction of the display surface. The transverse field mode includes, for example, the IPS (In-Plane Switching) mode and the FFS (Fringe Field Switching) mode which is one of the IPS modes. The technology described below can be applied to any of the vertical field mode and the transverse field mode, and the display device of the transverse field mode will be described in this embodiment.

Hereinafter, a display device DSP1 which is an electro-optical device according to this embodiment will be described in detail with reference to FIG. 1 to FIG. 6. First, the overall structure of the display device DSP1 will be described with reference to FIG. 1 to FIG. 3, and then a peripheral structure of a transparent region TRA constituting the main features of this embodiment will be described. Also, the transparent region TRA may be simply expressed as a first region.

<Configuration of Display Device DSP1>

FIG. 1 is a bottom view showing the display device DSP1 according to this embodiment, in which the display device DSP1 is seen from a back surface BS of a panel PNL. FIG. 1 shows the general layout of the panel PNL in the display device DSP1.

As shown in FIG. 1, the panel PNL includes a display region DA in which an image is formed in accordance with an input signal supplied from outside of the display device DSP1 and a non-display region NDA located in the periphery of the display region DA in a plan view. When a display surface of the display device DSP1 is seen, the display region DA is an effective region in which the display device DSP1 displays an image in a plan view.

In FIG. 1, the boundary between the display region DA and the non-display region NDA in a plan view is indicated by a two-dot chain line. The display region DA is a region in which a liquid crystal layer (electro-optical layer) LQ shown in FIG. 2 and others is formed, and the display region DA is surrounded by the non-display region NDA in a plan view. In other words, the non-display region NDA is a region in which the liquid crystal layer LQ is not formed. Although the display region DA shown in FIG. 1 is a quadrangle, the display region DA may have a shape other than a quadrangle, such as a polygon or a circle.

The non-display region NDA includes a peripheral region PFA adjacent to the display region DA. The peripheral region PFA is electrically connected to a wiring board (flexible wiring board) FWB disposed outside the display device DSP1, a circuit board CB shown in FIG. 2, and others.

Also, though described later with reference to FIG. 2 and others, a substrate SUB1 and a substrate SUB2 which are main structural components of the panel PNL are, for example, glass substrates and may be flexible resin substrates. The wiring board FWB, the circuit board CB, and others are folded to the back side of a backlight unit BLU. Therefore, in actual, the wiring board FWB and the circuit board CB are not visually recognized in a plan view seen from the normal direction (Z direction) to the display region DA.

Also, in FIG. 1, dot patterns are applied to a region (sealing region) in which a sealing material (adhesive) SLM is disposed in a plan view. The sealing material SLM is formed in the non-display region NDA including a part of the peripheral region PFA so as to surround the periphery of the display region DA, and is not formed in the display region DA.

Also, in the display region DA, a plurality of gate lines (scanning lines) GL extend in an X direction (column direction), and a plurality of source lines (signal lines, video signal lines) SL extend in a Y direction (row direction). The plurality of gate lines GL are arranged at intervals in the Y direction (row arrangement), and the plurality of source lines SL are arranged at intervals in the X direction (column arrangement). The position where each gate line GL and each source line SL intersect is a region in which a pixel PX is formed. A common electrode CE is electrically connected to a common electrode drive circuit formed on the wiring board FWB. A drive potential common to a plurality of pixels PX is supplied to the common electrode CE during the display period.

The plurality of gate lines GL are drawn out to the non-display region NDA outside the display region DA, and are connected to a gate drive circuit (scanning line drive circuit) GD. The plurality of source lines SL are drawn out to the non-display region NDA outside the display region DA, and are connected to a switch circuit unit SWS. Although not shown in detail, the gate drive circuit GD and the switch circuit unit SWS are electrically connected to the wiring board FWB via wiring formed in the panel PNL.

Figure 6:
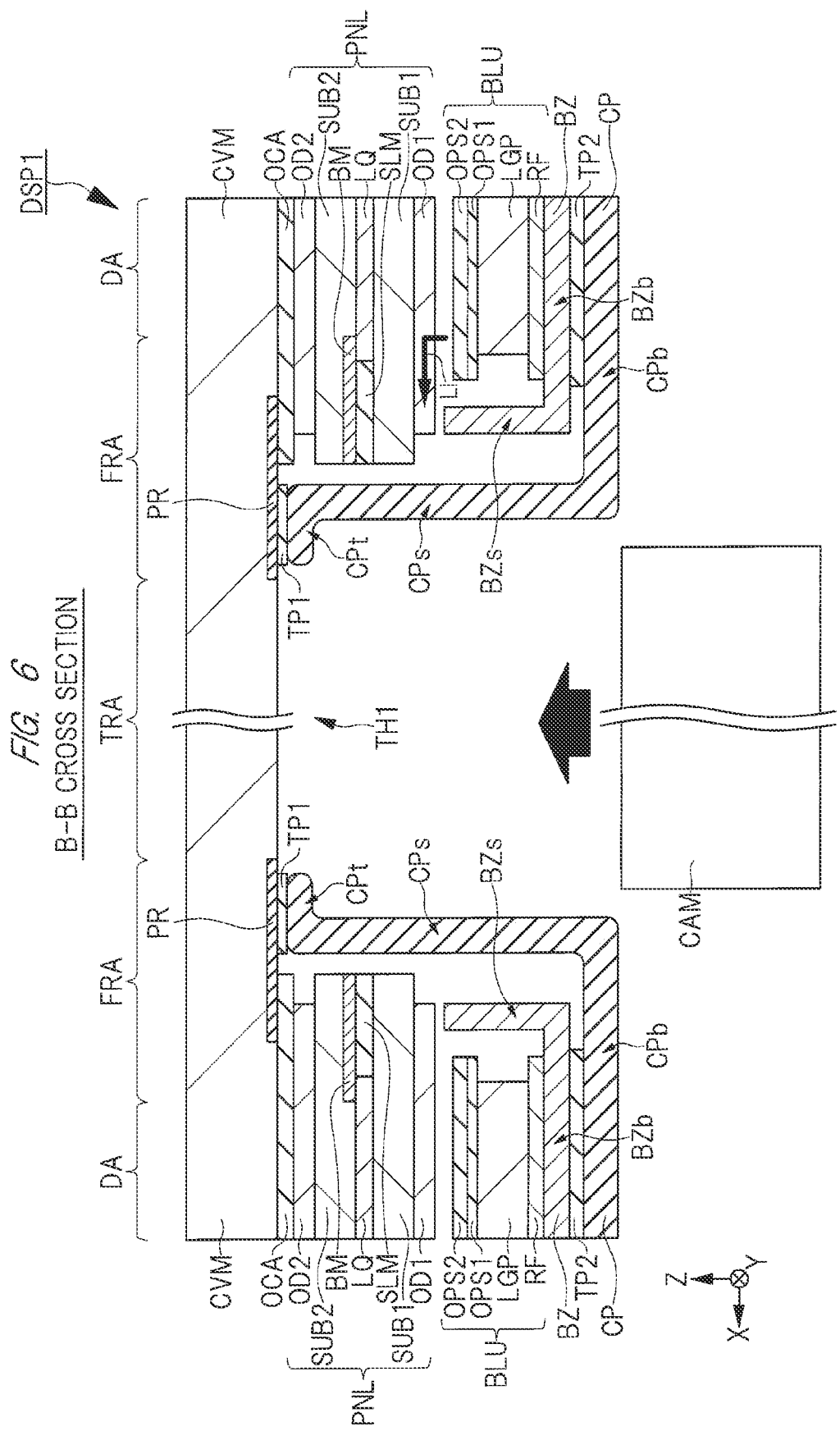
FIG. 6 is a cross-sectional view showing a peripheral structure of a transparent region according to the first embodiment.

Also, the panel PNL includes the transparent region TRA and a frame region FRA provided inside the display region DA in a plan view. In addition, when the transparent region TRA is expressed as the first region as described above, the frame region FRA may be simply expressed as a second region. The frame region FRA surrounds the transparent region TRA in a plan view and is provided between the display region DA and the transparent region TRA. Further, the frame region FRA is blocked from light by a light-blocking film BM and a print region (light-blocking layer) PR described later. For this reason, the frame region FRA can be restated as "light-blocking region". In this embodiment, a hole TH1 shown in FIG. 6 is formed in the panel PNL, and the hole TH1 is provided at a position overlapping with the entire transparent region TRA and a part of the frame region FRA in a plan view. In FIG. 1, for simplification of the description, the hole TH1 is illustrated as being provided at a position overlapping with the transparent region TRA.

Figure 12:
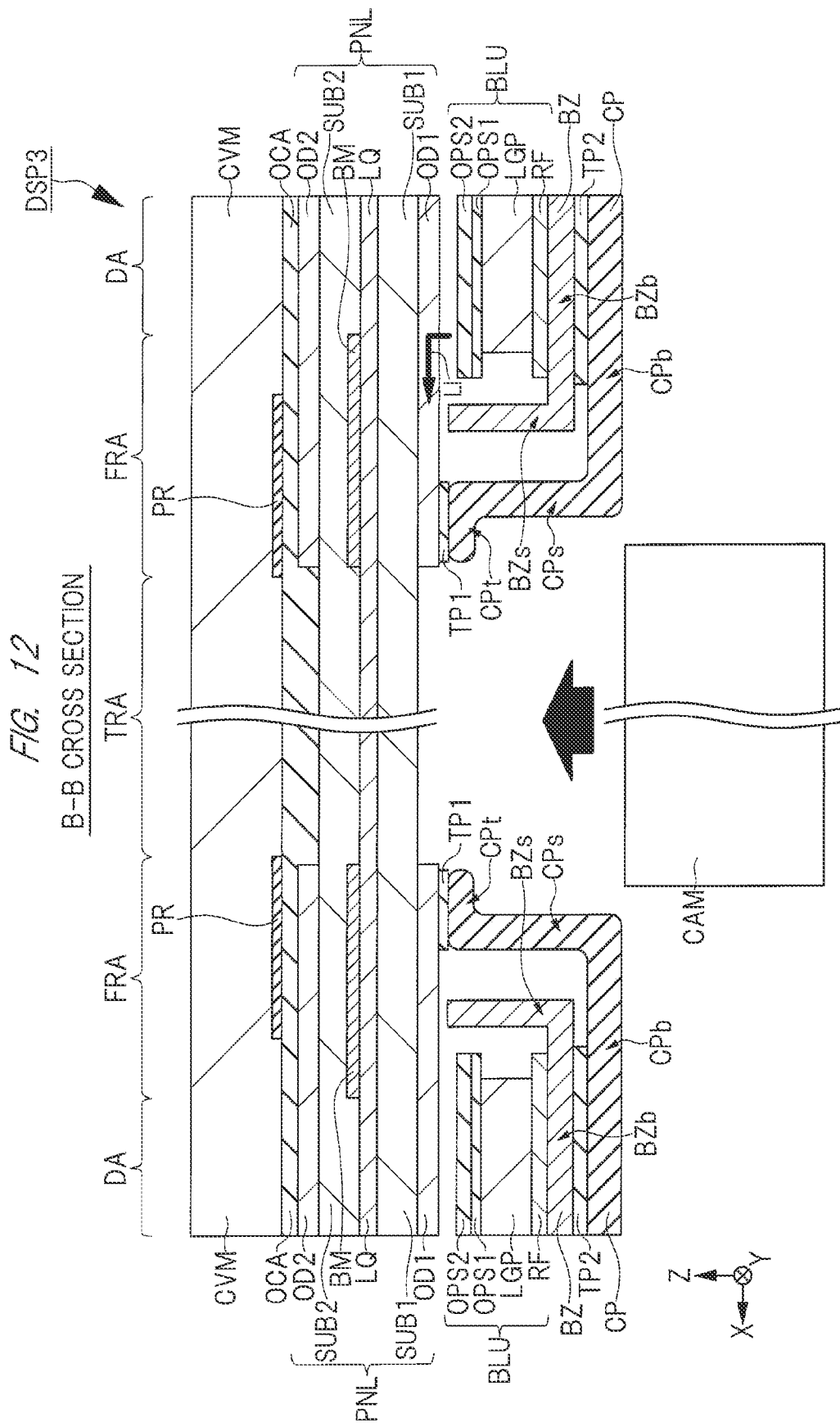
FIG. 12 is a cross-sectional view showing a peripheral structure of a transparent region according to a third embodiment.

A part of the frame region FRA and the transparent region TRA are regions in which a component such as a camera module CAM (see FIG. 6) is mounted to the display device DSP1. The transparent region TRA is made of a material that can transmit the visible light so that the visible light from the outside of the display device DSP1 enters the camera module CAM. Note that, in the region in which the camera module CAM is mounted, a component such as a microphone or a speaker may be mounted in addition to the camera module CAM. In this embodiment, the hole TH1 penetrating the panel PNL is formed in the transparent region TRA as shown in FIG. 6 described later. However, as shown in FIG. 12 described later, the transparent region TRA may be a region which does not penetrate the panel PNL, has a higher transmittance than the display region DA, and has a transparency that does not significantly impair the function of the camera module CAM.

Figure 2:
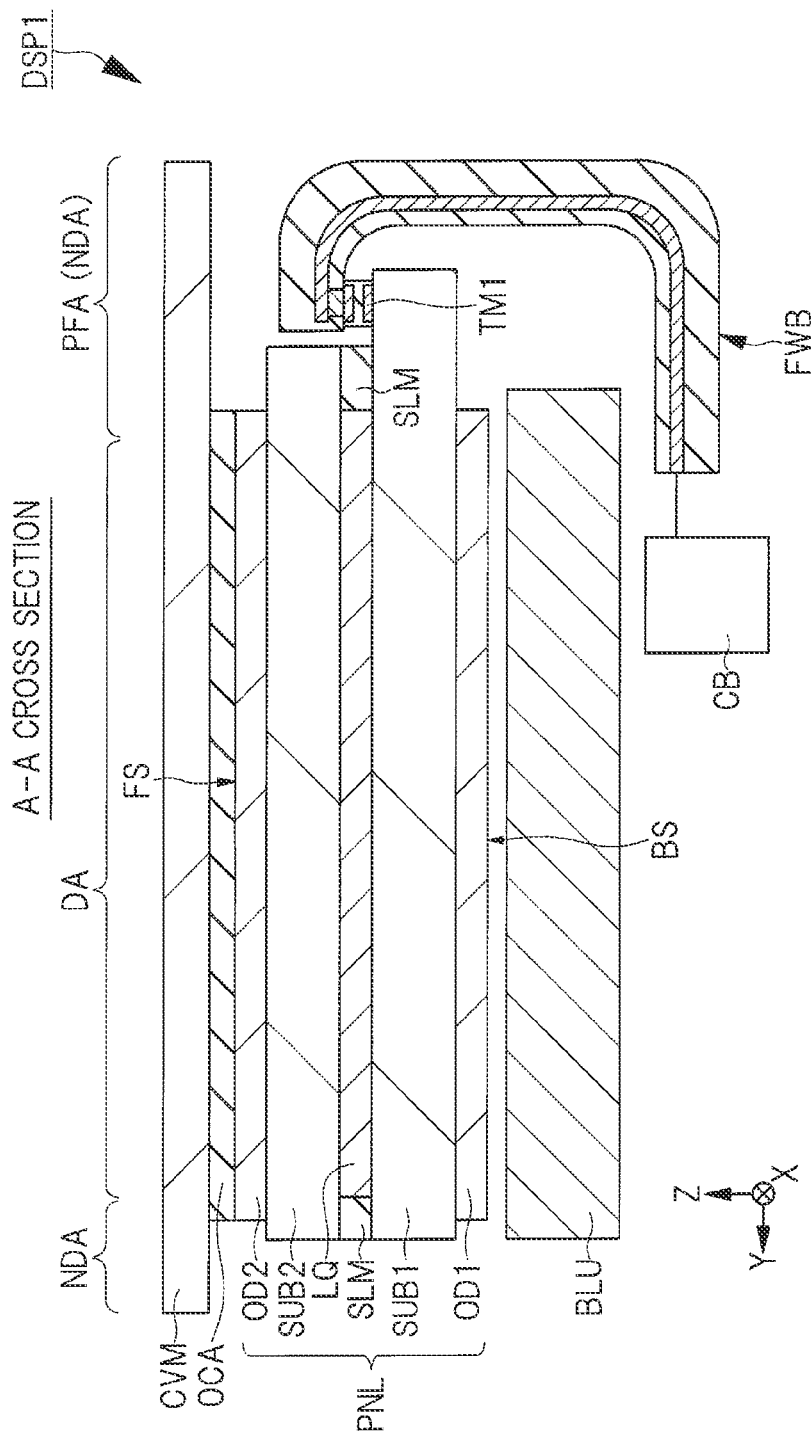
FIG. 2 is a cross-sectional view showing the display device according to the first embodiment.

FIG. 2 is a cross-sectional view taken along a line A-A shown in FIG. 1.

As shown in FIG. 2, in the display region DA, the panel PNL includes the substrate SUB1, the substrate SUB2 provided above the substrate SUB1, and the liquid crystal layer (electro-optical layer) LQ formed between the substrate SUB1 and the substrate SUB2. The substrate SUB1 and the substrate SUB2 face each other in the Z direction (thickness direction). The liquid crystal layer LQ is disposed inside the sealing material SLM with which a front surface of the substrate SUB1 and a back surface of the substrate SUB2 are bonded.

The panel PNL according to this embodiment includes a polarizing plate (optical element) OD1 and a polarizing plate (optical element) OD2. The polarizing plate OD1 is provided below the substrate SUB1, and the polarizing plate OD2 is provided above the substrate SUB2. In other words, the polarizing plate OD1 is provided on the back side of the substrate SUB1, and the polarizing plate OD2 is provided on the front side of the substrate SUB2. Each of the polarizing plates OD1 and OD2 may include a retardation plate as necessary.

Also, in the display region DA, the front side of the substrate SUB2 corresponds to the display surface side of the panel PNL (display device DSP1). In this embodiment, the front surface of the panel PNL is shown as a front surface FS, and the back surface of the panel PNL is shown as a back surface BS.

The backlight unit BLU is provided below the back surface BS of the panel PNL via the polarizing plate OD1. The backlight unit BLU has a function of emitting light in a direction from the substrate SUB1 to the substrate SUB2.

A cover member CVM is provided above the front surface FS of the panel PNL via an adhesive layer (optical adhesive tape) OCA so as to cover the display surface of the display device DSP1. The cover member CVM is a member for protecting the panel PNL, and is made of, for example, glass.

In the non-display region NDA, the substrate SUB1 and the substrate SUB2 are bonded via the sealing material SLM. The sealing material SLM also has a function of sealing the liquid crystal to be the liquid crystal layer LQ between the substrate SUB1 and the substrate SUB2.

The wiring board FWB is provided at a position overlapping with the backlight unit BLU in a plan view, and is electrically connected to a terminal TM1 formed on the substrate SUB1. As with the wiring board FWB, the circuit board CB is provided at a position overlapping with the backlight unit BLU in a plan view, and is electrically connected to the wiring inside the wiring board FWB.

Figure 3:
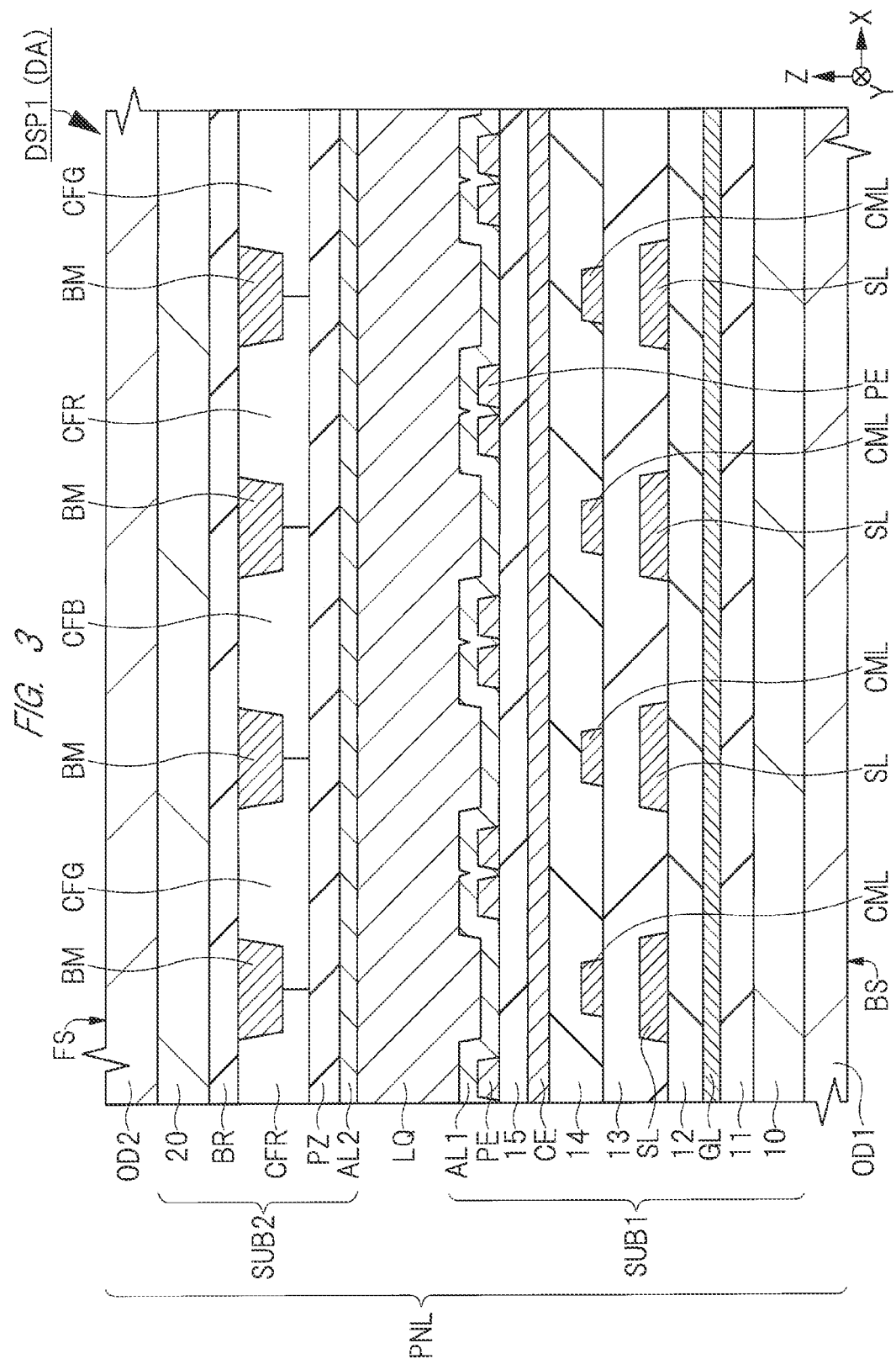
FIG. 3 is a cross-sectional view showing a principal part of the display device according to the first embodiment.

FIG. 3 is a partially enlarged cross-sectional view showing a principal part of the display region DA, and shows a detailed structure of the inside of the substrate SUB1 and the substrate SUB2 in the display region DA. Also, the gate line GL, the source line SL, the common electrode CE, the common signal line CML, and the pixel electrode PE which will be described below may actually be formed in different cross sections, but FIG. 3 intends to show the positional relationship thereof in the Z direction.

First, a detailed structure of the substrate SUB1 formed above the polarizing plate OD1 in the panel PNL will be described.

The substrate SUB1 includes a support substrate (insulative substrate) 10 having a property of transmitting the visible light. The support substrate 10 is, for example, a glass substrate.

An insulating film 11 made of an inorganic material is formed over the support substrate 10. The insulating film 11 is, for example, a single film such as a silicon nitride (SiN) film, a silicon oxide (SiO) film, a silicon oxynitride (SiON) film, or an aluminum oxide (AlOx) film or a stacked film obtained by stacking these film as appropriate. These films have an effect of preventing penetration of moisture, and function as barrier films.

The gate line GL is formed as a first conductive layer on the insulating film 11. The gate line GL is a light-blocking metal film containing, for example, molybdenum (Mo) or tungsten (W) as a main component. Note that the gate line GL is electrically connected to a gate electrode of the transistor. Alternatively, the gate line GL may constitute a gate electrode of the transistor in some cases.

An insulating film 12 made of an inorganic material is formed over the insulating film 11 so as to cover the gate line GL. The material constituting the insulating film 12 is the same as that of the insulating film 11. Also, a transistor having a gate electrode, a semiconductor layer and others is formed between the insulating film 11 and the insulating film 12.

The source line SL is formed as a second conductive layer on the insulating film 12. The source line SL is, for example, a stacked film obtained by stacking light-blocking metal films such as an aluminum (Al) film, a titanium (Ti) film, and a titanium nitride (TiN) film. Note that the source line SL is electrically connected to a source electrode of the transistor. An insulating film 13 is formed as an organic film over the insulating film 12 so as to cover the source line SL. The insulating film 13 is, for example, an acrylic resin film and is made of a photosensitive resin material.

A common signal line CML is formed as a third conductive layer on the insulating film 13. The common signal line CML is a wiring connected to the common electrode CE described later and configured to supply a common potential or a touch detection potential to the common electrode CE. The material constituting the common signal line CML is the same as that of the source line SL. An insulating film 14 made of an organic material is formed over the insulating film 13 so as to cover the common signal line CML. The material constituting the insulating film 14 is the same as that of the insulating film 13. The insulating film 13 and the insulating film 14 serve as planarization films.

The common electrode CE is formed as a fourth conductive layer on the insulating film 14. The common electrode CE is made of a conductive material having high transparency such as ITO (Indium Tin Oxide) or IZO (Indium Zinc Oxide), and is made of a conductive metal oxide. The common electrode CE is an electrode for driving the pixel electrode PE and the liquid crystal layer LQ described later and also has a function as a touch detection electrode when the panel PNL constitutes a touch panel though not described in detail. An insulating film 15 made of an inorganic material is formed over the insulating film 14 so as to cover the common electrode CE. The material constituting the insulating film 15 is the same as that of the insulating film 11. The insulating film 15 is a capacitive insulating film between the pixel electrode PE and the common electrode CE.

The pixel electrode PE is formed as a fifth conductive layer on the insulating film 15. The material constituting the pixel electrode PE is the same as that of the common electrode CE. Also, in this embodiment, a plurality of pixel electrodes PE are located between the two adjacent source lines SL in a plan view. An alignment film AL1 which is an organic film is formed over the insulating film 15 so as to cover the pixel electrode PE. The alignment film AL1 has a function of aligning the initial orientation of the liquid crystal molecules included in the liquid crystal layer LQ, and is made of, for example, a resin material such as polyimide. Further, the alignment film AL1 is in contact with the liquid crystal layer LQ.

Next, a detailed structure of the substrate SUB2 formed below the polarizing plate OD2 in the panel PNL will be described.

The substrate SUB2 includes a support substrate (insulative substrate) 20 having a property of transmitting the visible light. The support substrate 20 is, for example, a glass substrate.

A barrier film BR, a light-blocking film (black matrix) BM, a color filter CFR, a color filter CFG, a color filter CFB, a planarization film PZ, and an alignment film AL2 are formed between the support substrate 20 and the liquid crystal layer LQ.

The barrier film BR is formed over the entire back surface of the support substrate 20. The barrier film BR is made of an inorganic material and is, for example, an inorganic film (inorganic insulating film) containing at least one of silicon nitride, silicon oxide, silicon oxynitride, and aluminum oxide. Further, the barrier film BR is provided for, when the moisture existing outside the support substrate 20 penetrates into the support substrate 20, preventing the moisture from penetrating into the color filters CFR, CFG, and CFB, the liquid crystal layer LQ, and the like. However, the substrate SUB2 may have the structure without the barrier film BR.

On the back surface side of the support substrate 20, color filters of three colors (color conversion layer) are formed via the barrier film BR. In this embodiment, the red (R) color filter CFR, the green (G) color filter CFG, and the blue (B) color filter CFB are cyclically arranged. In the display device DSP1, for example, a color image is displayed by forming pixels of three colors of red (R), green (G), and blue (B) as one set. The plurality of color filters CFR, CFG, and CFB of the substrate SUB2 are disposed at positions facing the respective pixels PX including the pixel electrodes PE formed in the substrate SUB1. Note that the types of the color filters are not limited to three colors of red (R), green (G), and blue (B). In addition, the color filters CFR, CFG, and CFB of this embodiment include the color conversion layer which can change the wavelength of the light passing through itself.

Also, the light-blocking film BM is disposed at each of the boundaries between the plurality of color filters CFR, CFG, and CFB. The light-blocking film BM is made of, for example, black resin or low-reflective metal. For example, the light-blocking film BM is formed in a lattice shape in the display region DA in a plan view. In other words, the light-blocking film BM extends in the X direction and the Y direction, and has openings at positions overlapping with the pixel electrodes PE in a plan view. As described above, by dividing each pixel PX by the light-blocking film BM, it is possible to suppress the occurrence of light leakage and color mixing in each of the color filters CFR, CFG, and CFB. In general, among the openings of the light-blocking film BM, the edges of the openings formed closest to the outer perimeter are defined as the boundary between the display region DA and the non-display region NDA. As will be described later, the light-blocking film BM is formed also in the frame region FRA, but the light-blocking film BM in the frame region FRA and the non-display region NDA does not have the lattice shape.

The planarization film PZ covers the color filters CFR, CFG, and CFB on the back surface side of the support substrate 20. The planarization film PZ is a protective film for preventing impurities from diffusing from the color filters CFR, CFG, and CFB to the liquid crystal layer LQ, and is an insulating film for removing the step difference between the color filters and the light-blocking film. The planarization film PZ is formed of an organic resin material. Further, the planarization film PZ is also referred to as an overcoat film.

The alignment film AL2 is in contact with the liquid crystal layer LQ and is formed between the liquid crystal layer LQ and the planarization film PZ. The alignment film AL2 is made of the same material as the alignment film AL1, and has the same function as the alignment film AL1.

Also, in the configuration described above, each of the support substrate 10, the insulating films 11 to 15, the common electrode CE, the pixel electrode PE, the alignment film AL1, the alignment film AL2, the planarization film PZ, the barrier film BR, and the support substrate 20 has a property of being able to transmit the visible light. In addition, in the configuration described above, each of the gate line GL, the source line SL, the common signal line CML, and the light-blocking film BM has a property of being unable to transmit the visible light. Therefore, it is preferable that the metal wiring and the light-blocking film BM having a property of being unable to transmit the visible light are not formed in the transparent region TRA, but these may be formed in a part of the transparent region TRA if the function of the camera module CAM is not significantly impaired as compared with the display region DA.

<Configuration of Periphery of Transparent Region TRA>

Figure 4:
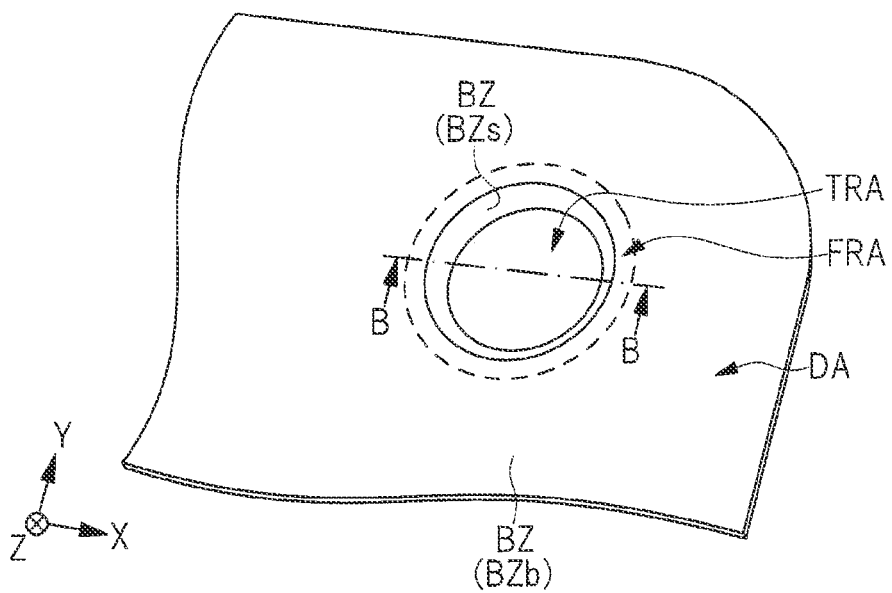
FIG. 4 is a perspective view showing a shape of a bezel according to the first embodiment.

FIG. 4 is a perspective view showing a shape of a bezel (housing) BZ used in the display device DSP1 according to this embodiment. Most of the bezel BZ is constituted of a bottom portion BZb parallel to a plane constituted by the X axis and the Y axis. However, in the frame region FRA around the transparent region TRA, the bezel BZ is bent in the Z direction, and this bent part is shown as a side portion BZs of the bezel BZ. Although not shown here, a plurality of slits may be provided in the outer periphery of the bezel BZ and at a corner portion formed by the side portion BZs and the bottom portion BZb of the bezel BZ for the purpose of improving the adhesion to a resin film such as the frame bonded to the bezel BZ.

Figure 5:
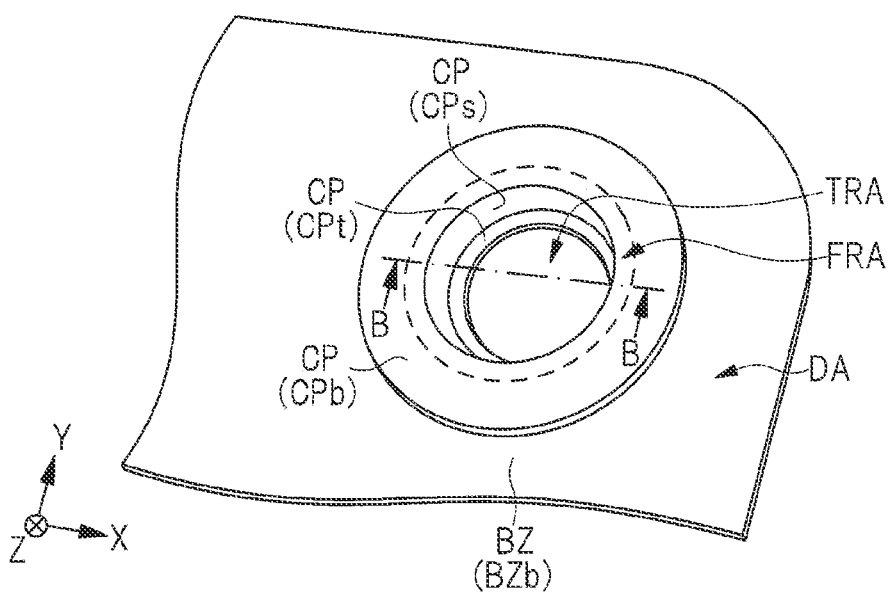
FIG. 5 is a perspective view showing the shape of the bezel to which a cap is attached according to the first embodiment.

FIG. 5 is a perspective view showing a shape of a cap film CP used in this embodiment. The cap film CP may be simply expressed as a cap CP. The cap film CP is a member attached to the bezel BZ. A bottom portion CPb of the cap film CP is provided so as to cover a part of the bottom portion BZb of the bezel BZ, and a side portion CPs of the cap film CP is provided so as to cover the side portion BZs of the bezel BZ. Also, the cap film CP has an upper portion CPt extending from the frame region FRA to the transparent region TRA. Namely, a width of the upper portion CPt of the cap film CP is larger than a width of the side portion CPs of the cap film CP in a plan view. The cap film CP is inserted into the cover member CVM from the bezel BZ.

FIG. 6 is a cross-sectional view taken along a line B-B shown in FIG. 1, FIG. 4, and FIG. 5, showing a structure in the periphery of the transparent region TRA in the display device DSP1.

As shown in FIG. 6, the hole TH1 penetrating the support substrate 10, the liquid crystal layer LQ, and the support substrate 20 is formed in a part of the frame region FRA and the transparent region TRA. The hole TH1 has a planar shape in line with the shape of the transparent region TRA shown in FIG. 1. The sealing material SLM is disposed in the frame region FRA between the liquid crystal layer LQ and the hole TH1, and the sealing material SLM can prevent the liquid crystal of the liquid crystal layer LQ from leaking into the hole TH1.

The camera module CAM is provided so as to overlap with a part of the frame region FRA and the transparent region TRA in a plan view, and the camera module CAM is mounted in the hole TH1 in this embodiment.

Also, the adhesive layer OCA, the polarizing plate OD2, and the polarizing plate OD1 are formed so as not to extend up to the transparent region TRA, and side surfaces thereof are located in the frame region TRA. Since the polarizing plate OD2 and the polarizing plate OD1 are not disposed in the transparent region TRA, the transparency in the transparent region TRA is ensured.

The cover member CVM is provided above the panel PNL including the hole TH1 so as to cover the transparent region TRA, the frame region FRA, and the display region DA. In the frame region FRA, the print region (light-blocking layer) PR made of, for example, black ink is formed on a part of the cover member CVM, and the light-blocking film BM made of, for example, black resin or low-reflective metal is formed between the substrate SUB2 and the substrate SUB1. Each of the print region PR and the light-blocking film BM has a property of blocking the visible light. Therefore, it is possible to prevent light from the periphery of the transparent region TRA from being mixed into the lens of the camera provided in the camera module CAM.

The backlight unit BLU is provided below the panel PNL and above the bezel BZ in the frame region FRA and the display region DA so as not to overlap with the transparent region TRA in a plan view. The backlight unit BLU includes a reflection film RF provided over the bottom portion BZb of the bezel BZ, a light guide layer LGP formed over the reflection film RF, and an optical sheet formed over the light guide layer LGP. The optical sheet includes a diffusion sheet OPS1 formed over the light guide layer LGP and a prism sheet OPS2 formed over the diffusion sheet OPS1.

Though not shown here, a light source such as a laser diode is provided in the vicinity of the backlight unit BLU of the display device DSP1. The light emitted from the laser diode propagates inside the light guide layer LGP, and is diffused by the diffusion sheet OPS1 to be a more uniform surface light source. The light which has passed through the diffusion sheet OPS1 is oriented in the direction along the Z direction by the prism sheet OPS2. The reflection film RF has a function of reflecting the light emitted to the side opposite to the panel PNL and returning the reflected light to the panel PNL in order to improve the brightness of the display device DPS1.

The bezel BZ according to this embodiment includes the bottom portion BZb configured to cover the lower side of the backlight unit BLU and the side portion BZs provided on the lateral side of the backlight unit BLU and provided between the backlight unit BLU and the cap film CP in the frame region FRA. The bezel BZ has a function of blocking the visible light and is made of a metal material such as stainless steel.

The cap film CP includes the bottom portion CPb bonded to the bottom portion BZb of the bezel BZ via an adhesive tape (adhesive layer) TP2, the side portion CPs configured to cover each lateral side of the backlight unit BLU and the panel PNL, and the upper portion CPt bonded to the cover member CVM including the print region PR via an adhesive tape (adhesive layer) TP1. The cap film CP is made of a material different from that of the bezel BZ, for example, a black polycarbonate film or an acrylic resin film.

Main Feature of Display Device DSP1 According to this Embodiment

The cap film CP according to this embodiment has a function of blocking a specific wavelength, and in this case has a function of blocking the visible light and is made of, for example, a black acrylic resin film. Further, the cap film CP is provided on the lateral side of the backlight unit BLU in the frame region FRA, and the camera module CAM mounted so as to overlap with the transparent region TRA in a plan view is provided on the lateral side of the backlight unit BLU via the cap film CP. Therefore, it is possible to prevent the light emitted from the backlight unit BLU from leaking to the camera module CAM. Accordingly, the image generated by the camera module CAM becomes more accurate and clearer, so that the performance of the display device DPS1 can be improved.

In addition, the study by the inventors of the present invention has revealed that the light leaking from the backlight unit BLU contains the light propagating inside the panel PNL. In particular, as shown in FIG. 6, light LI propagating inside the polarizing plate OD1 is less likely to be attenuated as compared with other portions of the panel PNL, and the light LI is likely to propagate to the side surface of the polarizing plate OD1. Even when the light LI propagating inside the polarizing plate OD1 as such is present, the leakage of the light LI to the camera module CAM can be prevented in this embodiment because the cap film CP covers the lateral side of the panel PNL including the polarizing plate OD1.

Also, a width of the upper portion CPt of the cap film CP is larger than a width of the side portion CPs of the cap film CP in a plan view. Therefore, it is possible to increase the adhesion strength between the cap film CP and the cover member CVM.

Also, the side portion BZs of the bezel BZ is provided between the backlight unit BLU and the cap film CP so as to cover the lateral side of the backlight unit BLU. Therefore, since the lateral side of the backlight unit BLU is covered not only by the side portion CPs of the cap film CP but also by the side portion BZs of the bezel BZ, it is possible to further prevent the light emitted from the backlight unit BLU from leaking to the camera module CAM.

Also, it is conceivable to cover the lateral side of the backlight unit BLU by only the side portion BZs of the bezel BZ without providing the cap film CP. Here, the side portion BZs of the bezel BZ is formed by bending a part of the bezel BZ (bottom portion BZb) and pulling the bent part in many cases. However, since there is a limitation to the strength of the material constituting the bezel BZ, it is difficult to secure the height of the side portion BZs of the bezel BZ so as to sufficiently cover each lateral side of the backlight unit BLU and the panel PNL.

For the problem like this, each lateral side of the backlight unit BLU and the panel PNL can be easily covered by using the cap film CP which is a member separate from the bezel BZ as in this embodiment. For example, even when the thickness of each of the backlight unit BLU and the panel PNL in the Z direction is changed to a larger thickness in accordance with the specifications of the product, the height of the side portion CPs of the cap film CP can be easily changed. Namely, it is possible to increase the degree of freedom in the design of the display device DSP1 by using the cap film CP according to this embodiment.

Further, the size of the camera module CAM is not strictly constant, and for example, the height or the width thereof may vary depending on the products. Thus, when the camera module CAM is mounted in the transparent region TRA, the camera module CAM may come into contact with the bezel BZ or the panel PNL, causing a problem that the surface of the camera module CAM is worn. Alternatively, the margin for mounting the camera module CAM below the transparent region TRA may become insufficient.

Therefore, by providing the cap film CP made of a material (for example, a resin film) softer than the bezel BZ as in this embodiment, the problem related to the wear mentioned above can be suppressed, and the camera module CAM can be accommodated in the transparent region TRA by pressing the camera module CAM to the cap film CP. Namely, by setting the rigidity of the material constituting the cap film CP to be lower than the rigidity of the material constituting the bezel BZ, the various problems described above can be suppressed.

(First Modification)

A first modification of the first embodiment will be described below with reference to FIG. 7 and FIG. 8.

In the first modification, the shape of the cap film CP is the same but the shape of the bezel BZ is different as compared with the first embodiment.

Figure 7:
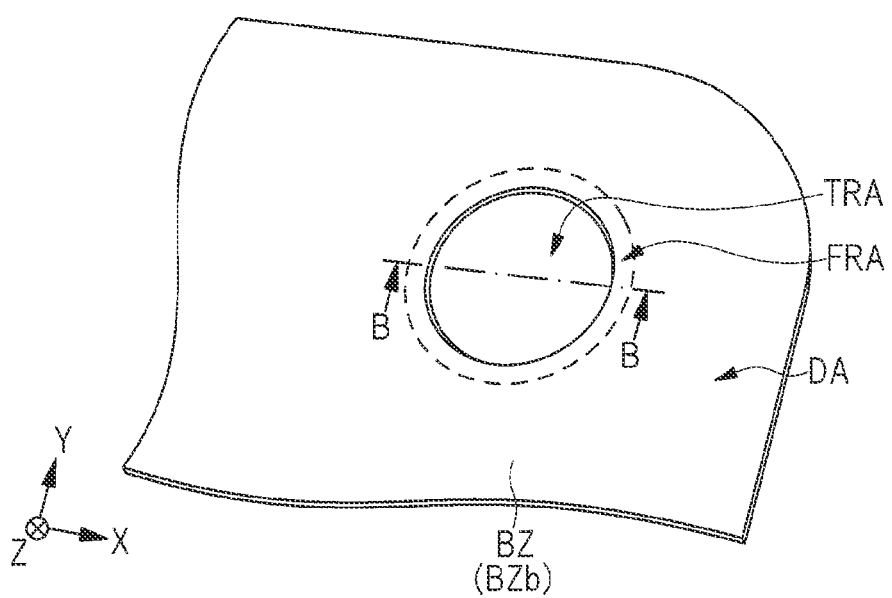
FIG. 7 is a perspective view showing a shape of a bezel according to a first modification.
Figure 8:
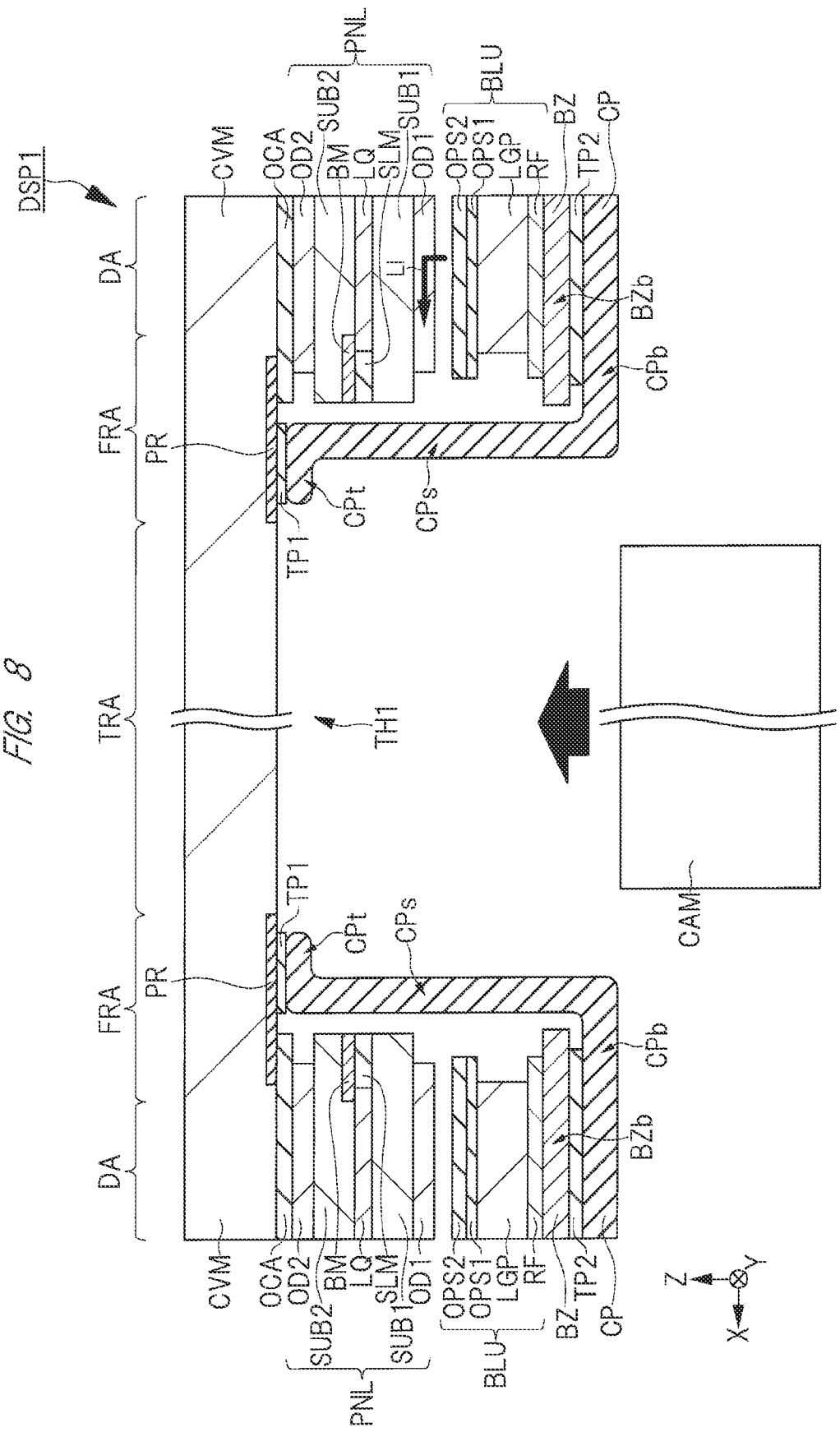
FIG. 8 is a cross-sectional view showing a peripheral structure of a transparent region according to the first modification.

As shown in FIG. 7 and FIG. 8, the bezel BZ according to the first modification includes the bottom portion BZb but does not include the side portion BZs, and the side portion BZs of the bezel BZ is not provided between the backlight unit BLU and the cap film CP.

Therefore, the first embodiment is superior to the first modification in terms of suppressing the light leakage to the camera module CAM. However, since the side portion BZs of the bezel BZ is not provided in the first modification, the width of the frame region FRA can be reduced by that much. Thus, the diameter of the cap film CP in FIG. 5 can be made slightly wider than that in the first embodiment. Namely, since the width of the frame region FRA is reduced in the first modification, the width of the transparent region TRA can be increased by that much. Therefore, the field of view of the camera module CAM can be expanded, and the characteristics of the camera module CAM can be improved.

Alternatively, in the state where the diameter of the cap film CP is set to be the same as that of the first embodiment and the width of the transparent region TRA is set to be the same as that of the first embodiment, the width of the display region DA may be increased by an amount corresponding to the reduction in the width of the frame region FRA. Accordingly, the overall area of the display region DA can be increased, and more pixels PX can be arranged in the display region DA. Further, in this case, by increasing the width of the display region DA, the width of the light guide layer LGP, the diffusion sheet OPS1, and the prism sheet OPS2 can be increased, and the appearance of the backlight unit BLU can be improved.

Second Embodiment

Hereinafter, a display device DSP2 which is an electro-optical device according to a second embodiment will be described with reference to FIG. 9 and FIG. 10. Note that the difference between the second embodiment and the first embodiment will be mainly described below.

In the second embodiment, the shape of the bezel BZ is the same but the shape of the cap film CP is different as compared with the first embodiment.

Figure 9:
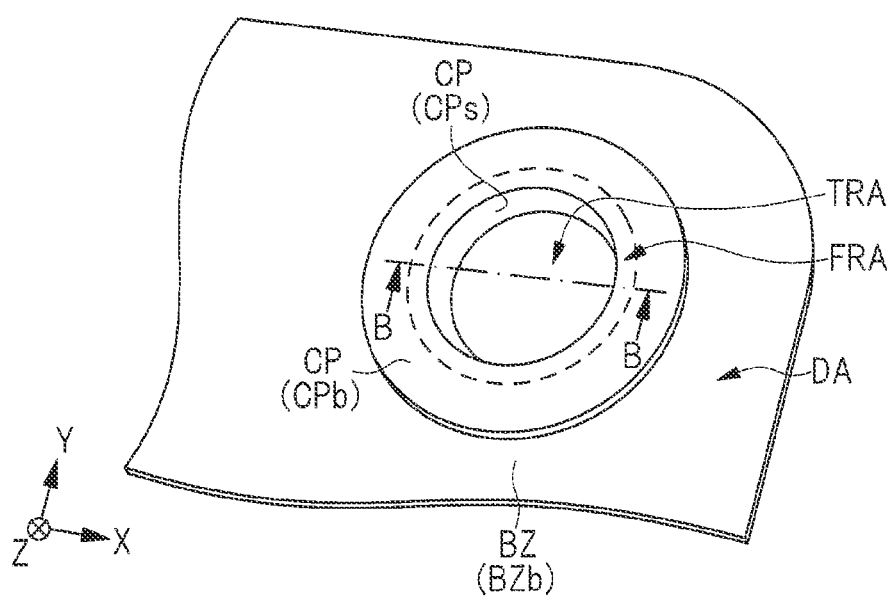
FIG. 9 is a perspective view showing a shape of a bezel to which a cap is attached according to a second embodiment.
Figure 10:
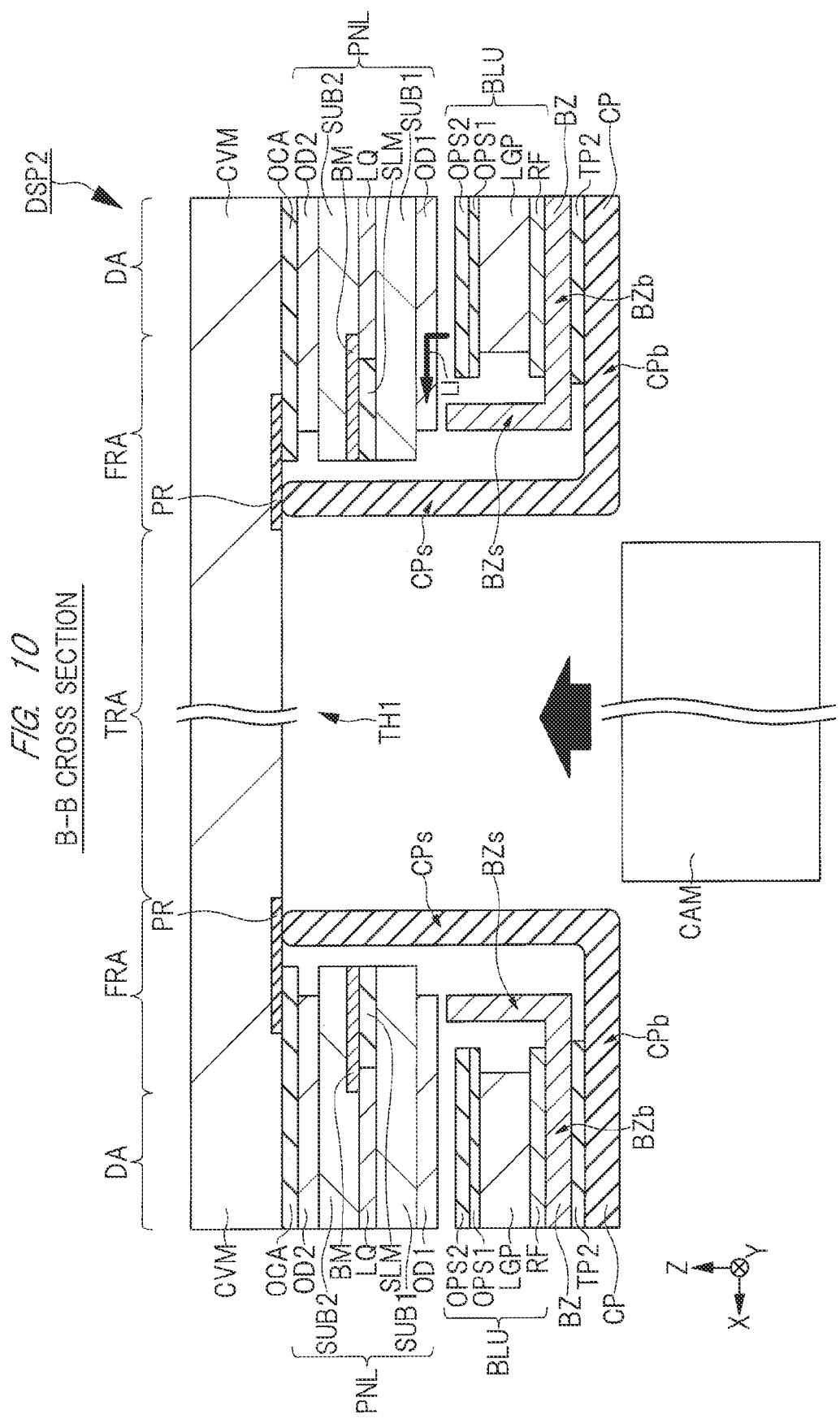
FIG. 10 is a cross-sectional view showing a peripheral structure of a transparent region according to the second embodiment.

As shown in FIG. 9 and FIG. 10, the cap film CP according to the second embodiment includes the bottom portion CPb and the side portion CPs but does not include the upper portion CPt. Also, although the adhesive layer TP1 is not provided between the cap film CP and the cover member CVM in FIG. 10, the adhesive layer TP1 may be provided at this location.

As described in the first embodiment, the width of the side portion CPs of the cap film CP is smaller than the width of the upper portion CPt of the cap film CP in a plan view. Therefore, the first embodiment is superior to the second embodiment in terms of increasing the adhesion strength between the cap film CP and the cover member CVM. However, since the width of the upper portion CPt of the cap film CP is eliminated in the second embodiment, the width of the frame region FRA can be reduced by that much. Namely, since the width of the frame region FRA is reduced as compared with the first embodiment, the width of the transparent region TRA or the width of the display region DA can be further increased by that much in the second embodiment.

(Second Modification)

A second modification of the second embodiment will be described below with reference to FIG. 11. The technology related to the first modification is used in the second modification.

In the second modification, the shape of the cap film CP is almost the same but the shape of the bezel BZ is different as compared with the second embodiment. Namely, the shape of the bezel BZ is the same as that of FIG. 7 and the shape of the cap film CP is the same as that of FIG. 9 in the second modification.

Figure 11:
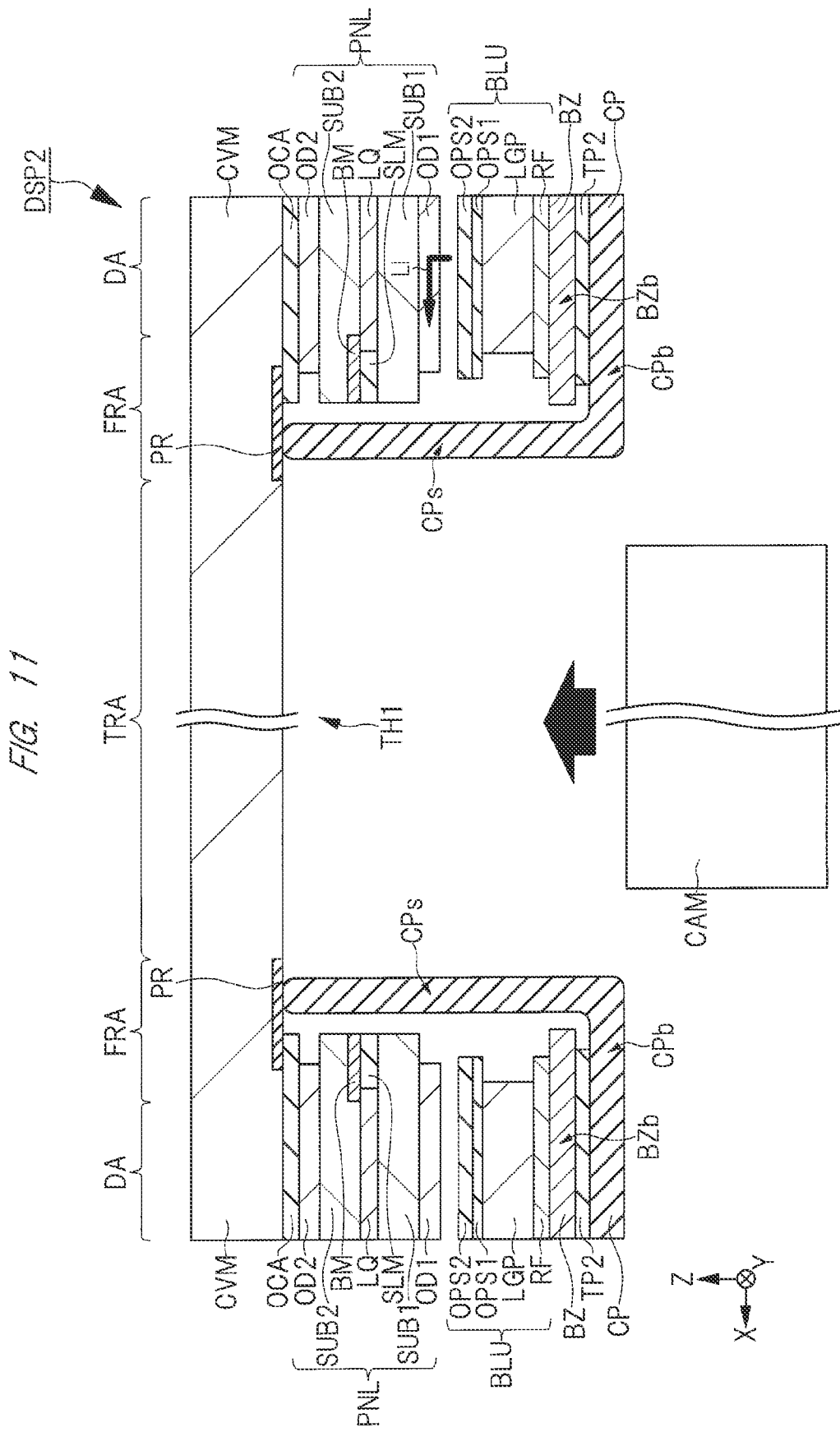
FIG. 11 is a cross-sectional view showing a peripheral structure of a transparent region according to a second modification.

As shown in FIG. 11, the bezel BZ according to the second modification includes the bottom portion BZb but does not include the side portion BZs, and the side portion BZs of the bezel BZ is not provided between the backlight unit BLU and the cap film CP.

Therefore, the second embodiment is superior to the second modification in terms of suppressing the light leakage to the camera module CAM. However, since the side portion BZs of the bezel BZ is not provided in the second modification, the width of the frame region FRA can be reduced by that much. Namely, since the width of the frame region FRA is further reduced in the second modification, the width of the transparent region TRA or the width of the display region DA can be further increased by that much as compared with the second embodiment.

Third Embodiment

Hereinafter, a display device DSP3 which is an electro-optical device according to a third embodiment will be described with reference to FIG. 12. Note that the difference between the third embodiment and the first embodiment will be mainly described below.

In the third embodiment, the hole TH1 described in the first embodiment is not formed in the panel PNL. In the third embodiment, the shape of the bezel BZ is the same as that of FIG. 4 except the height of the bezel BZ, and the shape of the cap film CP is almost the same as that of FIG. 5 except the height of the cap film CP.

As shown in FIG. 12, the panel PNL excluding the polarizing plate OD1 and the polarizing plate OD2 is provided over the display region DA, the frame region FRA, and the transparent region TRA in the third embodiment. Also, in the transparent region TRA, the adhesive layer OCA is provided between the substrate SUB2 and the cover member CVM. However, structural components made of a material which cannot transmit the visible light such as the gate line GL, the source line SL, the common signal line CML, the light-blocking film BM, and the transistor are not formed in the panel PNL in the transparent region TRA.

In other words, structural components made of a material which can transmit the visible light are formed in the panel PNL in the transparent region TRA. For example, the panel PNL in the transparent region TRA includes some or all of structural components such as the support substrate 10, the insulating films 11 to 15, the common electrode CE, the pixel electrode PE, the alignment film AL1, the alignment film AL2, the planarization film PZ, the barrier film BR, and the support substrate 20.

Since the panel PNL in the transparent region TRA is made up of the structural components described above, the light from outside of the display device DP3 can enter the camera module CAM.

Also, since the hole TH1 is not formed in the panel PNL in the transparent region TRA in the third embodiment, the strength of the display device DP3 in the periphery of the transparent region TRA can be increased as compared with the first embodiment.

Further, in the frame region FRA, the upper portion CPt of the cap film CP is bonded to the panel PNL via the adhesive layer TP1. The width of the upper portion CPt of the cap film CP is larger than the width of the side portion CPs of the cap film CP in a plan view. Therefore, it is possible to increase the adhesion strength between the cap film CP and the panel PNL.

Although FIG. 12 shows the case in which the upper portion CPt of the cap film CP is bonded to the polarizing plate OD1 in the panel PNL, the upper portion CPt of the cap film CP may be bonded to the substrate SUB1 in the panel PNL via the adhesive layer TP1 by providing the side surface of the polarizing plate OD1 at a position closer to the display region DA than the side portion CPs of the cap film CP. In this case, as described in the first embodiment with reference to FIG. 6, even when the light LI propagating inside the polarizing plate OD1 is present, the leakage of the light LI to the camera module CAM can be further prevented because the cap film CP covers the lateral side of the panel PNL including the polarizing plate OD1.

Further, in the third embodiment, the height of the side portion CPs of the cap film CP in the Z direction is smaller than that of the first embodiment. Therefore, the cap film CP can be manufactured more easily and the cost of the material constituting the cap film CP can be reduced.

(Third Modification)

A third modification of the third embodiment will be described below with reference to FIG. 13. The technology related to the first modification and the second modification is used in the third modification.

In the third modification, the shape of the cap film CP is almost the same but the shape of the bezel BZ is different as compared with the third embodiment. Namely, the shape of the bezel BZ is the same as that of FIG. 7 and the shape of the cap film CP is the same as that of FIG. 5 except the height of the cap film CP in the third modification.

Figure 13:
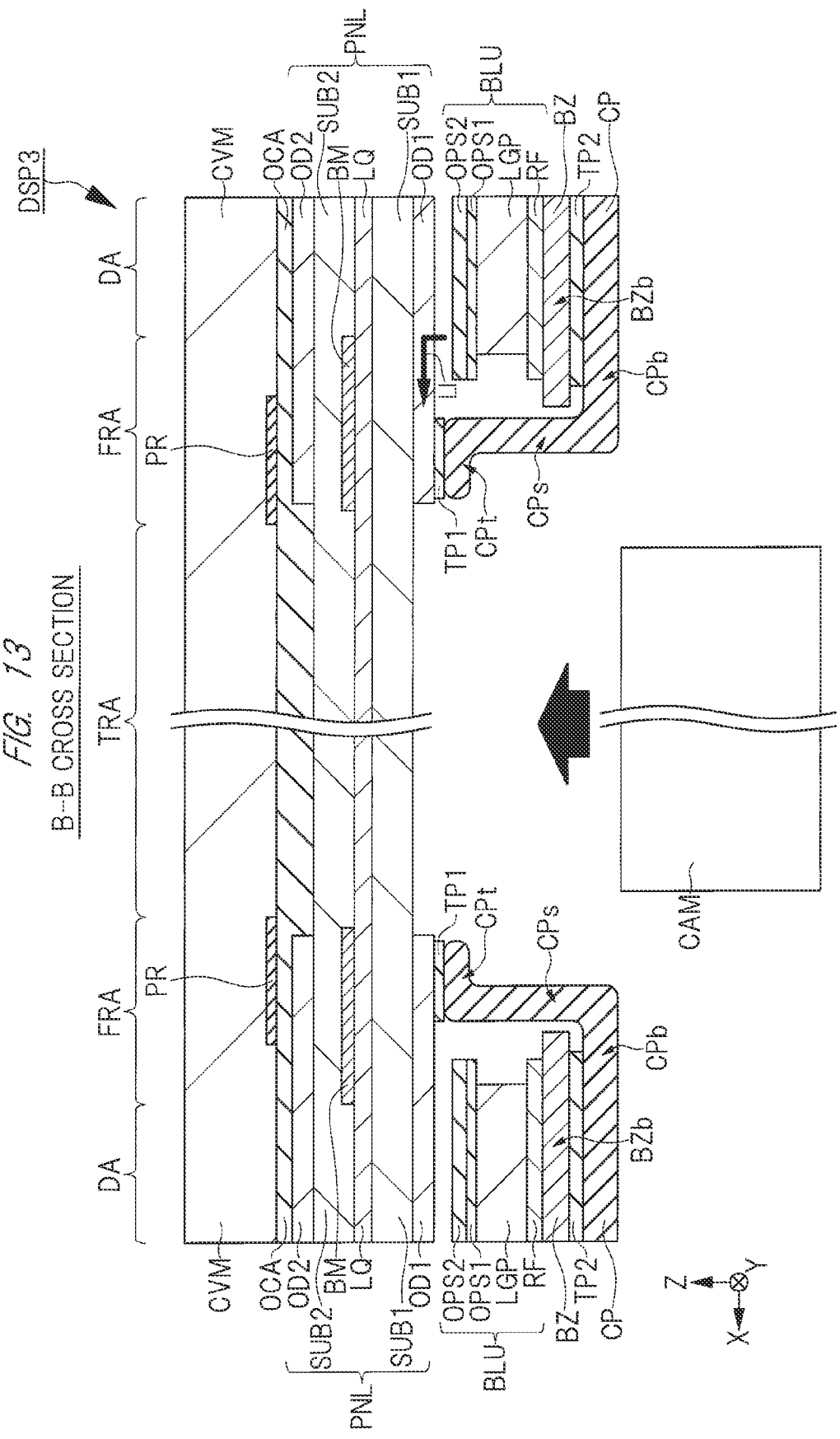
FIG. 13 is a cross-sectional view showing a peripheral structure of a transparent region according to a third modification.

As shown in FIG. 13, the bezel BZ according to the third modification includes the bottom portion BZb but does not include the side portion BZs, and the side portion BZs of the bezel BZ is not provided between the backlight unit BLU and the cap film CP.

Therefore, the third embodiment is superior to the third modification in terms of suppressing the light leakage to the camera module CAM. However, since the side portion BZs of the bezel BZ is not provided in the third modification, the width of the frame region FRA can be reduced by that much. Namely, since the width of the frame region FRA is further reduced in the third modification, the width of the transparent region TRA or the width of the display region DA can be further increased by that much as compared with the third embodiment.

Fourth Embodiment

Hereinafter, a display device DSP4 which is an electro-optical device according to a fourth embodiment will be described with reference to FIG. 14. Note that the difference between the fourth embodiment and the third embodiment will be mainly described below.

In the fourth embodiment, the hole TH1 is not formed in the panel PNL as in the third embodiment. Also, in the fourth embodiment, the shape of the bezel BZ is the same but the shape of the cap film CP is different as compared with the third embodiment. Namely, in the fourth embodiment, the shape of the bezel BZ is the same as that of FIG. 4, and the shape of the cap film CP is almost the same as that of FIG. 9 except the height of the cap film CP.

Figure 14:
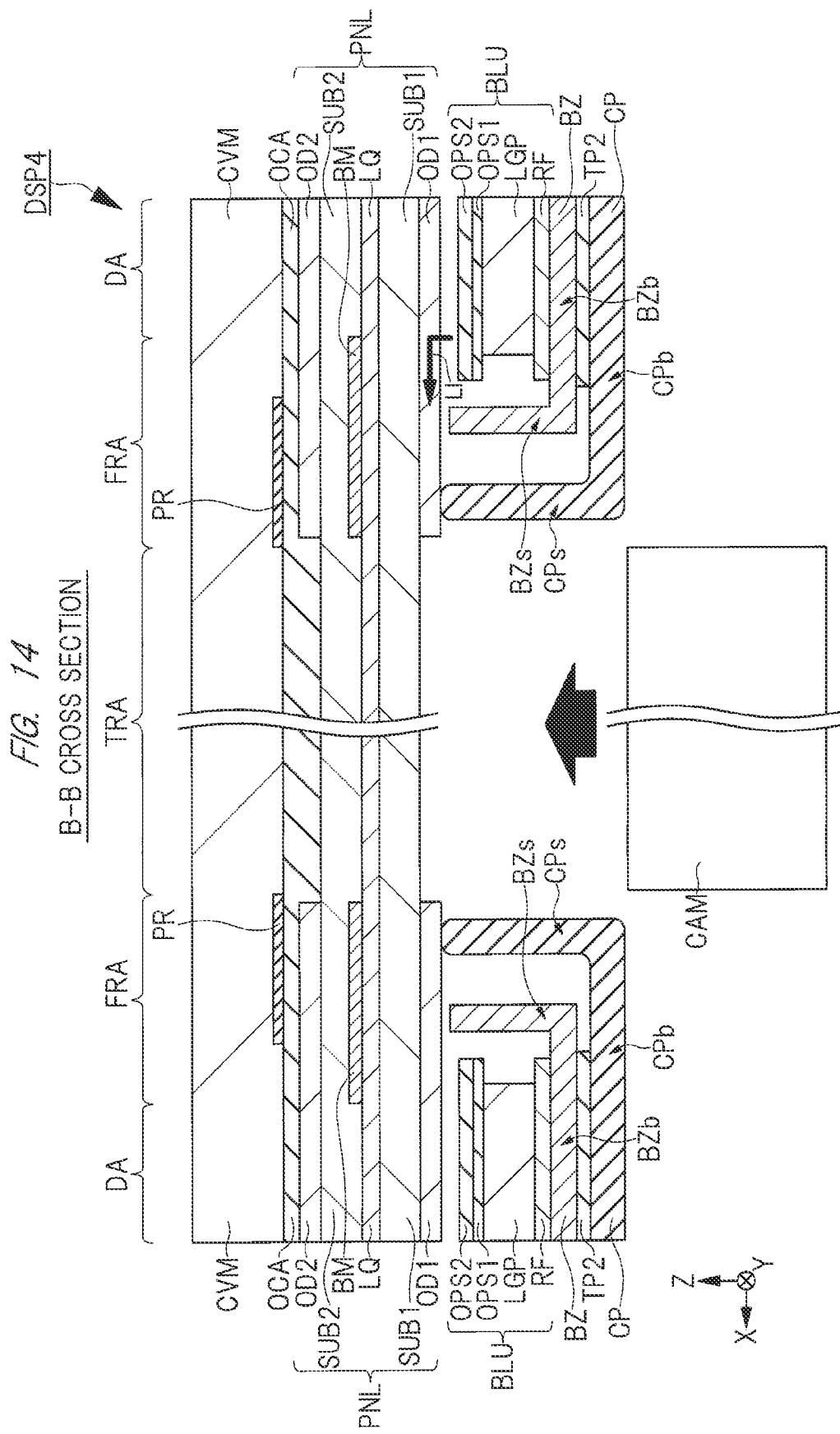
FIG. 14 is a cross-sectional view showing a peripheral structure of a transparent region according to a fourth embodiment.

As shown in FIG. 14, the cap film CP according to the fourth embodiment includes the bottom portion CPb and the side portion CPs but does not include the upper portion CPt. Also, although the adhesive layer TP1 is not provided between the cap film CP and the panel PNL in FIG. 14, the adhesive layer TP1 may be provided at this location.

Therefore, the third embodiment is superior to the fourth embodiment in terms of increasing the adhesion strength between the cap film CP and the panel PNL. However, since the width of the upper portion CPt of the cap film CP is eliminated in the fourth embodiment, the width of the frame region FRA can be reduced by that much. Namely, since the width of the frame region FRA is reduced in the fourth embodiment, the width of the transparent region TRA or the width of the display region DA can be increased by that much as compared with the third embodiment.

(Fourth Modification)

A fourth modification of the fourth embodiment will be described below with reference to FIG. 15. The technology related to the first to third modifications is used in the fourth modification.

In the fourth modification, the shape of the cap film CP is almost the same but the shape of the bezel BZ is different as compared with the fourth embodiment. Namely, the shape of the bezel BZ is the same as that of FIG. 7 and the shape of the cap film CP is almost the same as that of FIG. 9 except the height of the cap film CP in the fourth modification.

Figure 15:
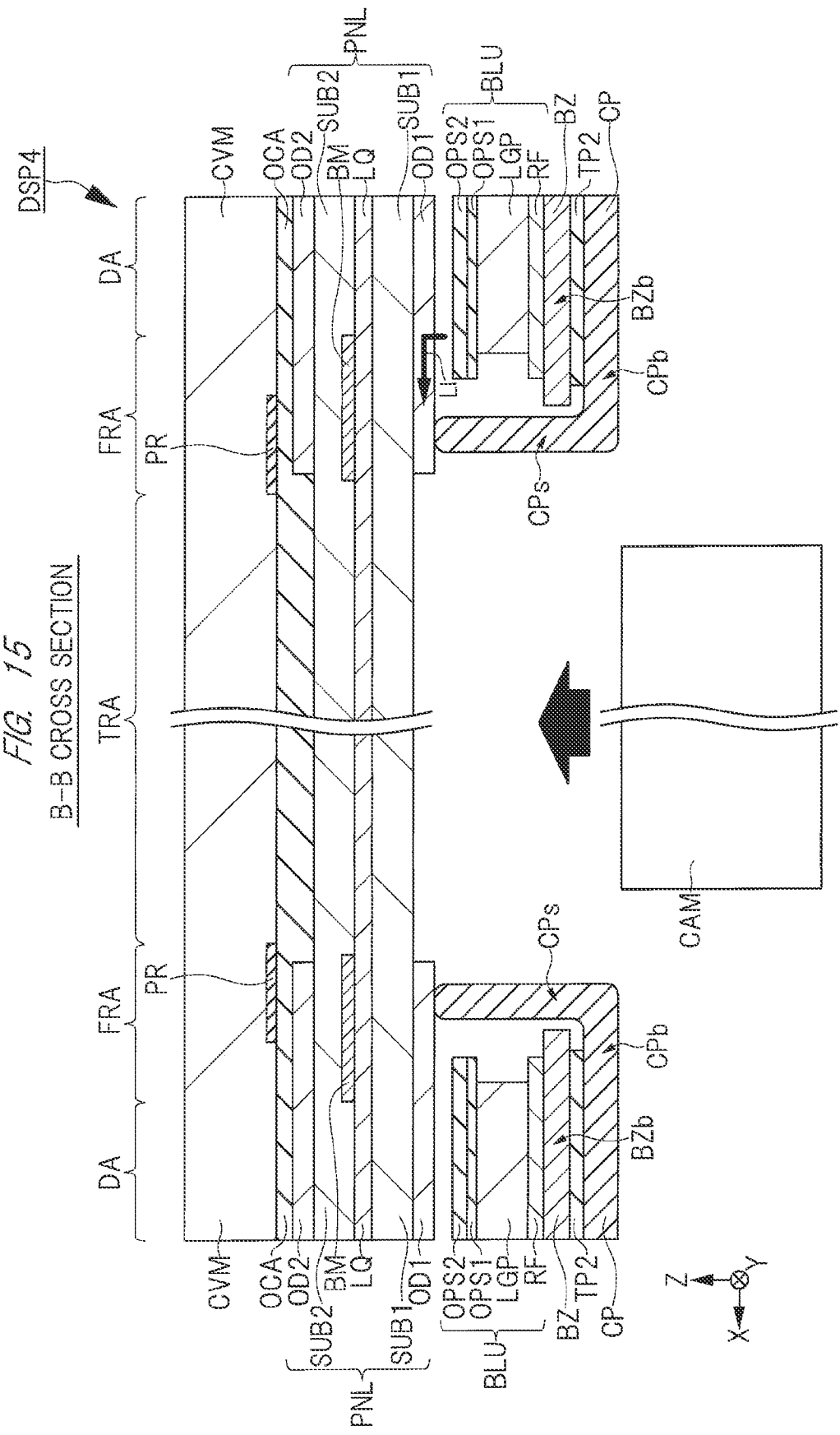
FIG. 15 is a cross-sectional view showing a peripheral structure of a transparent region according to a fourth modification.

As shown in FIG. 15, the bezel BZ according to the fourth modification includes the bottom portion BZb but does not include the side portion BZs, and the side portion BZs of the bezel BZ is not provided between the backlight unit BLU and the cap film CP.

Therefore, the fourth embodiment is superior to the fourth modification in terms of suppressing the light leakage to the camera module CAM. However, since the side portion BZs of the bezel BZ is not provided in the fourth modification, the width of the frame region FRA can be reduced by that much. Namely, since the width of the frame region FRA is further reduced in the fourth modification, the width of the transparent region TRA or the width of the display region DA can be further increased by that much as compared with the fourth embodiment.

Fifth Embodiment

Hereinafter, a display device DSP5 which is an electro-optical device according to a fifth embodiment will be described with reference to FIG. 16. Note that the difference between the fifth embodiment and the first embodiment will be mainly described below.

In the first embodiment, the cap film CP is bonded to the bezel BZ.

In the fifth embodiment, the cap film CP is bonded to the camera module CAM via an adhesive layer (adhesive tape) TP3 and an adhesive layer (adhesive tape) TP4. Namely, it is also possible to prepare the camera module CAM to which the cap film CP is bonded in advance and then mount the camera module CAM to the transparent region TRA. The effect similar to that of the first embodiment related to the cap film CP can be obtained also in the fifth embodiment.

Figure 16:
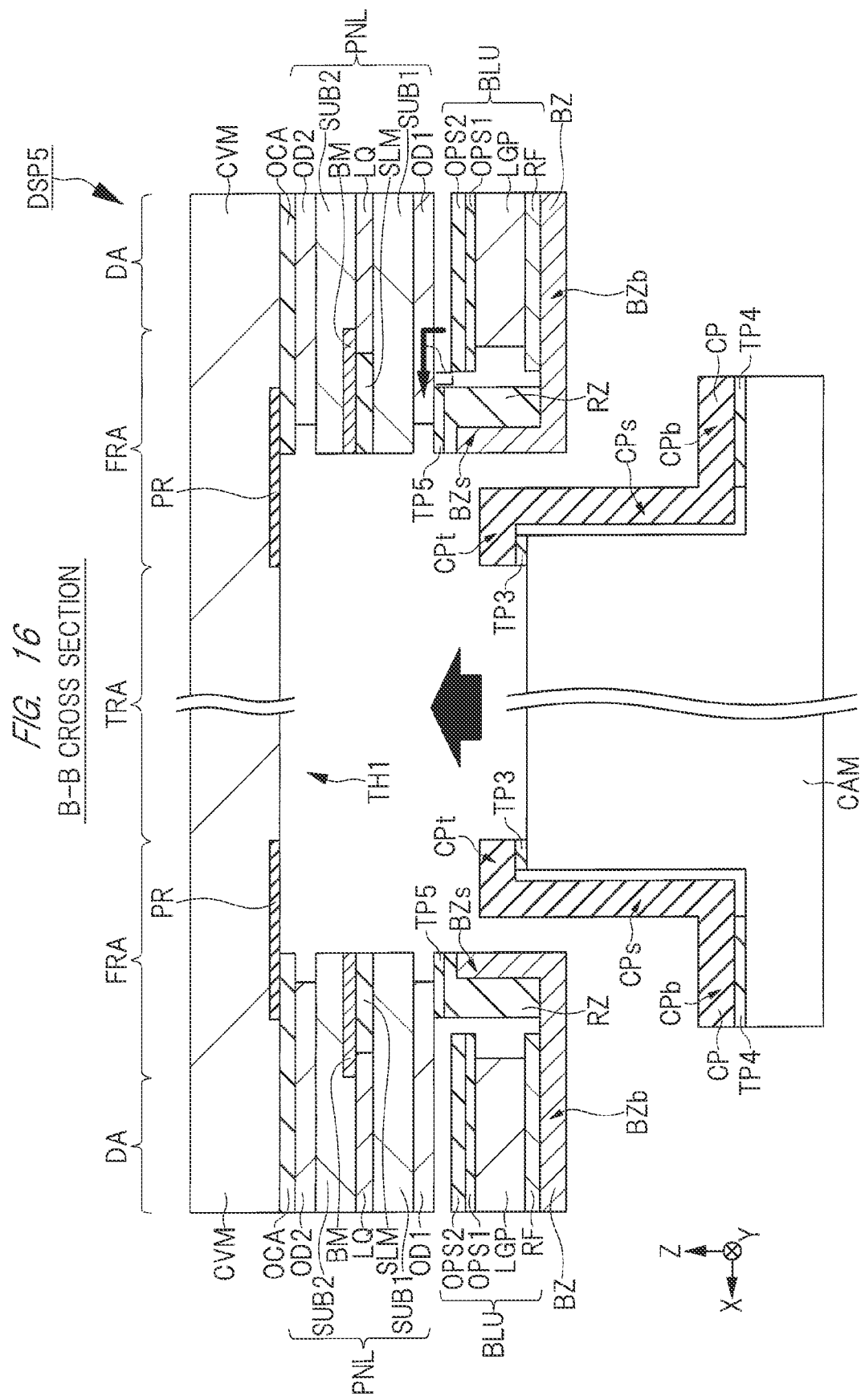
FIG. 16 is a cross-sectional view showing a peripheral structure of a transparent region according to a fifth embodiment.

Although the upper portion CPt of the cap film CP is bonded to the camera module CAM via the adhesive layer TP3 and the bottom portion CPb of the cap film CP is bonded to the camera module CAM via the adhesive layer TP4 in FIG. 16, the means for bonding the cap film CP and the camera module CAM is not limited to this. For example, all or a part of the upper portion CPt, the side portion CPs, and the bottom portion CPb of the cap film CP may be bonded to the camera module CAM via an adhesive layer such as the adhesive layer TP3. Also, the upper portion CPt of the cap film CP may be bonded to the cover member CVM via the adhesive layer TP1 shown in FIG. 6, and the bottom portion CPb of the cap film CP may be bonded to the bezel BZ via the adhesive layer TP2 shown in FIG. 6.

In addition, a resin film RZ is provided between the backlight unit BLU and the bezel BZ in the fifth embodiment. Further, the resin film RZ is bonded to the panel PNL via an adhesive layer (adhesive tape) TP5. The resin film RZ is made of, for example, an acrylic resin film and may be a black resin film having a function of blocking the visible light. Note that the formation of the resin film RZ like this is not indispensable but may be applied to each of the first to fourth embodiments and the first to fourth modifications described above.

Also, in the fifth embodiment, the shape of the cap film CP is not limited to that of FIG. 5 in the first embodiment and may be the shape of FIG. 9 in the second embodiment.

In addition, the technology disclosed in the fifth embodiment can be applied even to the case in which the hole TH1 is not provided in the panel PNL as in the third embodiment and the fourth embodiment.

(Fifth Modification)

A fifth modification of the fifth embodiment will be described below with reference to FIG. 17.

Figure 17:
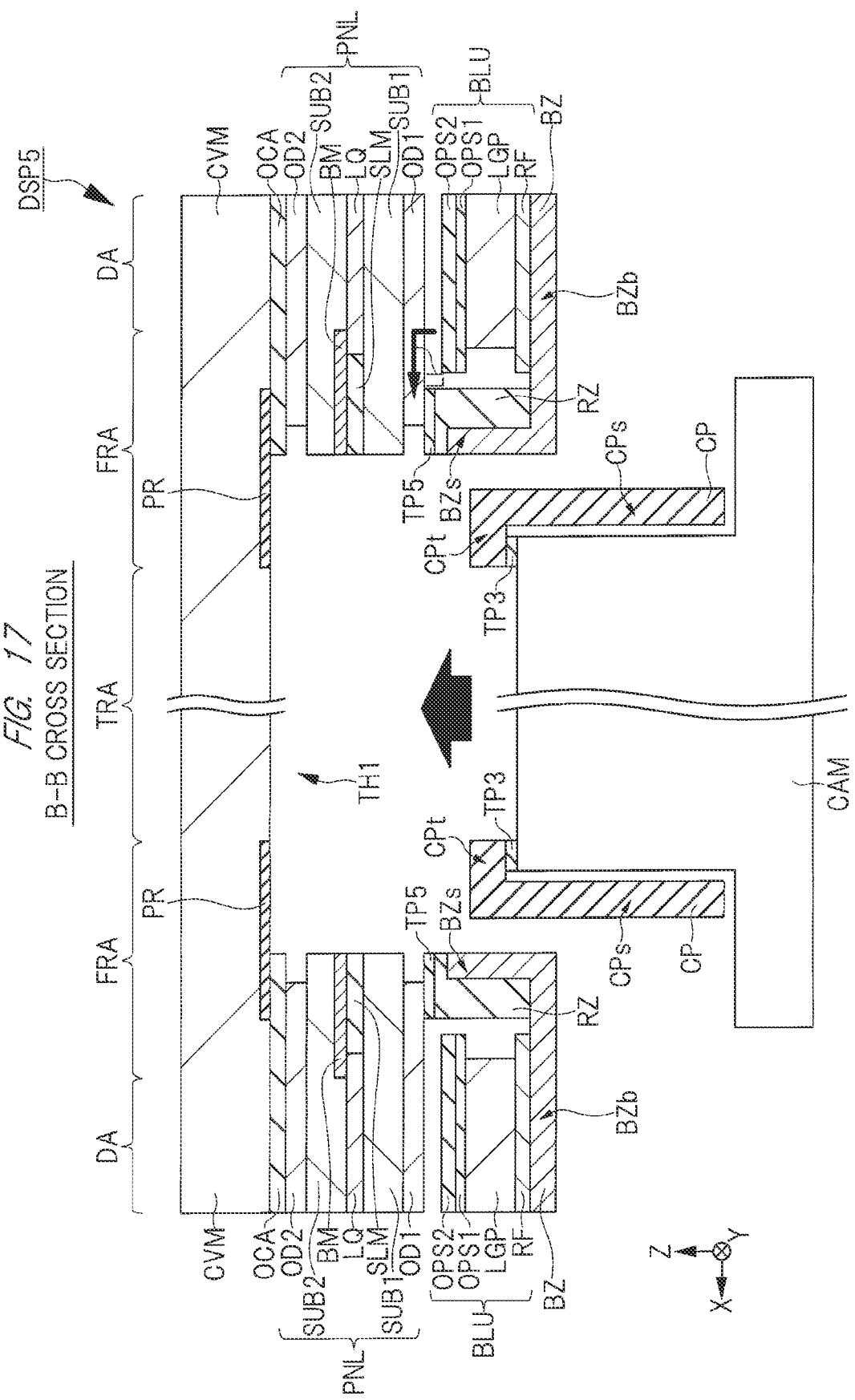
FIG. 17 is a cross-sectional view showing a peripheral structure of a transparent region according to a fifth modification.

As shown in FIG. 17, in the fifth modification, it is only necessary that, among the upper portion CPt, the side portion CPs, and the bottom portion CPb of the cap film CP, at least the side portion CPs of the cap film CP is formed. FIG. 17 shows the case in which the cap CP includes the upper portion CPt and the side portion CPs, but it is only necessary that at least the side portion CPs of the cap film CP is provided between the backlight unit BLU and the camera module CAM and the camera module CAM and the cap film CP are bonded to each other.

When the cap film CP is bonded to the camera module CAM as described above, the shape of the cap film CP is not limited to those disclosed in the first to fourth embodiments.

Sixth Embodiment

Hereinafter, a display device DSP6 which is an electro-optical device according to a sixth embodiment will be described with reference to FIG. 18 and FIG. 19. Note that the difference between the sixth embodiment and the first embodiment will be mainly described below.

In the first to fifth embodiments and the first to fifth modifications, the cap film CP is used for blocking the light leaking from the backlight unit BLU. However, in the sixth embodiment, the technology for blocking the light mainly by the bezel BZ without providing the cap film CP will be described.

Figure 18:
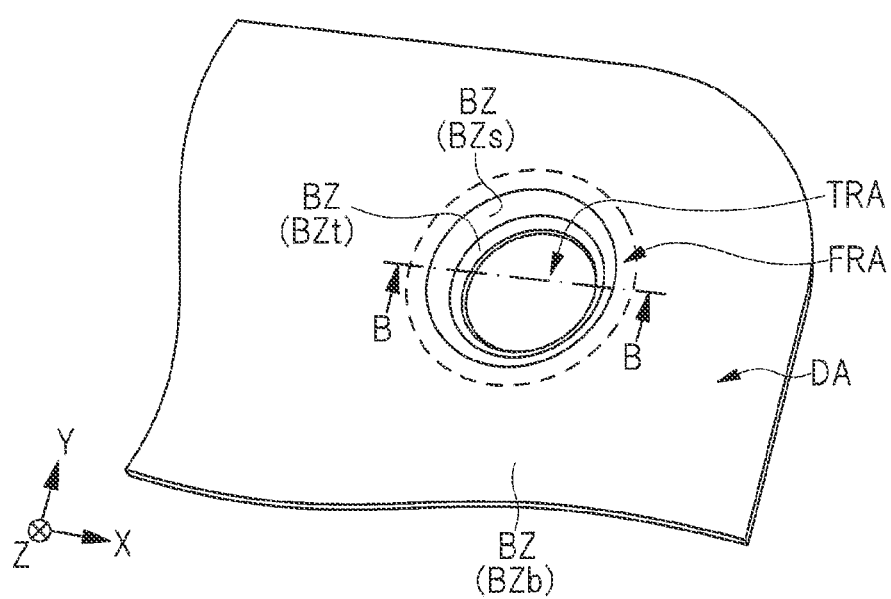
FIG. 18 is a perspective view showing a shape of a bezel according to a sixth embodiment.
Figure 19:
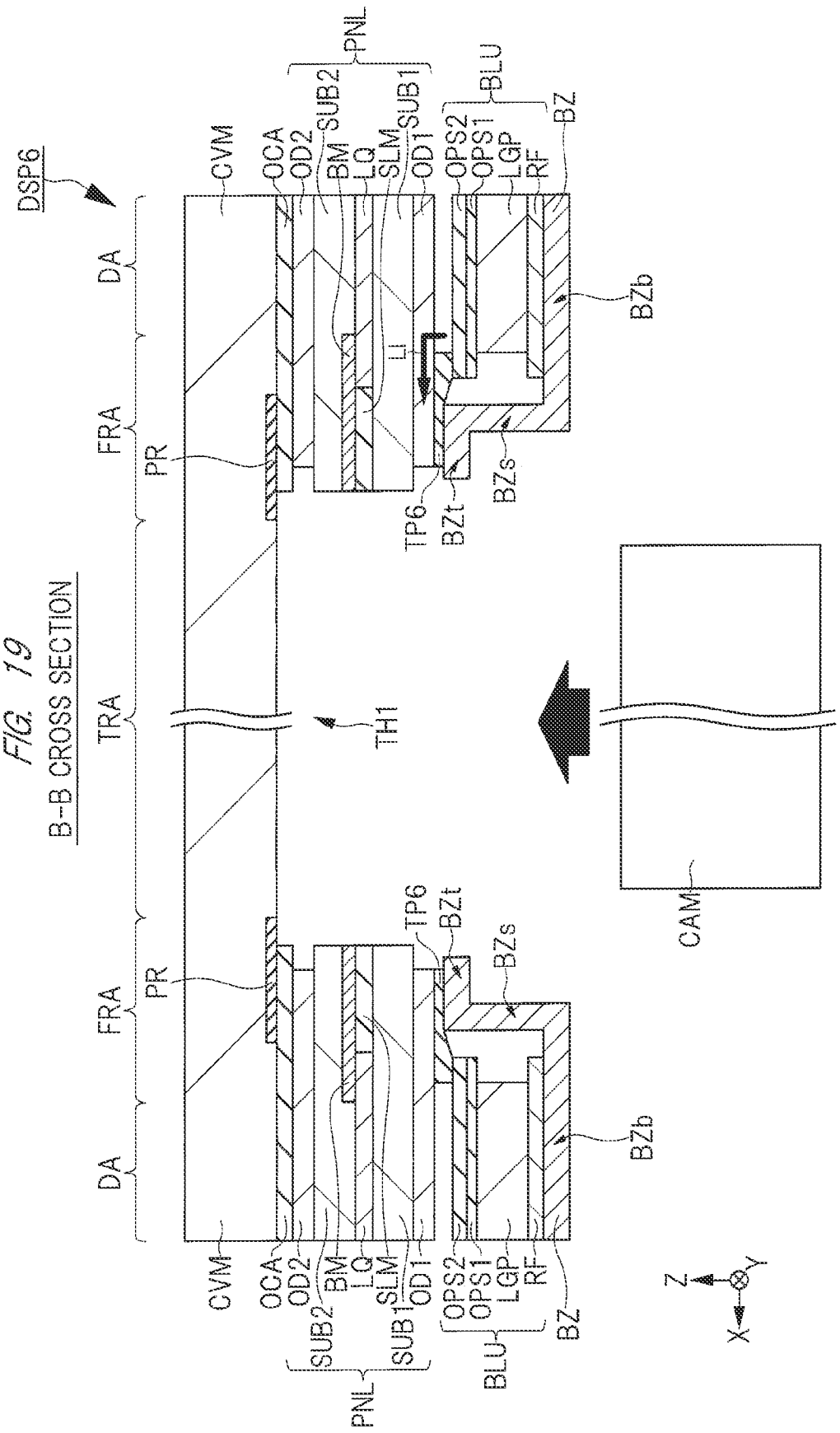
FIG. 19 is a cross-sectional view showing a peripheral structure of a transparent region according to the sixth embodiment.

As shown in FIG. 18 and FIG. 19, the bezel BZ according to the sixth embodiment includes not only the bottom portion BZb and the side portion BZs but also an upper portion BZt.

Since the side portion BZs of the bezel BZ is provided so as to cover the lateral side of the backlight unit BLU, it is possible to prevent the light emitted from the backlight unit BLU from leaking to the camera module CAM.

The various effects by the cap film CP cannot be obtained in the sixth embodiment. However, since the cap film CP is not provided in the sixth embodiment, the width of the frame region FRA can be reduced by that much. Namely, since the width of the frame region FRA is reduced in the sixth embodiment, the width of the transparent region TRA or the width of the display region DA can be increased by that much as compared with the first embodiment. Also, the manufacturing cost for forming the cap film CP can be suppressed.

Also, the bezel BZ, the panel PNL, and the backlight unit BLU are bonded to each other by an adhesive layer (adhesive tape) TP6. Specifically, the upper portion BZt of the bezel BZ, the polarizing plate OD1, and the prism sheet (optical sheet) OPS2 are bonded to each other by the adhesive layer TP6. Here, the width of the upper portion BZt of the bezel BZ is larger than the width of the side portion BZs of the bezel BZ in a plan view. Therefore, it is possible to increase the adhesion strength between the bezel BZ and the panel PNL.

Also, the material constituting the adhesive layer TP6 is actually made up of a plurality of thin films such as an upper adhesive sheet, a resin film, and a lower adhesive sheet. Here, each of the thin films may be provided with the function of blocking the visible light. For example, it is also possible to mix a black dye in each of the thin films. In this case, the light leaking between the backlight unit BLU and the panel PNL can be further blocked.

(Sixth Modification)

A sixth modification of the sixth embodiment will be described below with reference to FIG. 20.

In the sixth embodiment, the upper portion BZt of the bevel BZ is bonded to the polarizing plate OD1 via the adhesive layer TP6, but the upper portion BZt of the bevel BZ is bonded to the substrate SUB1 via the adhesive layer TP6 in the sixth modification. Namely, the upper portion BZt of the bezel BZ, the substrate SUB1, and the prism sheet (optical sheet) OPS2 are bonded to each other by the adhesive layer TP6.

Figure 20:
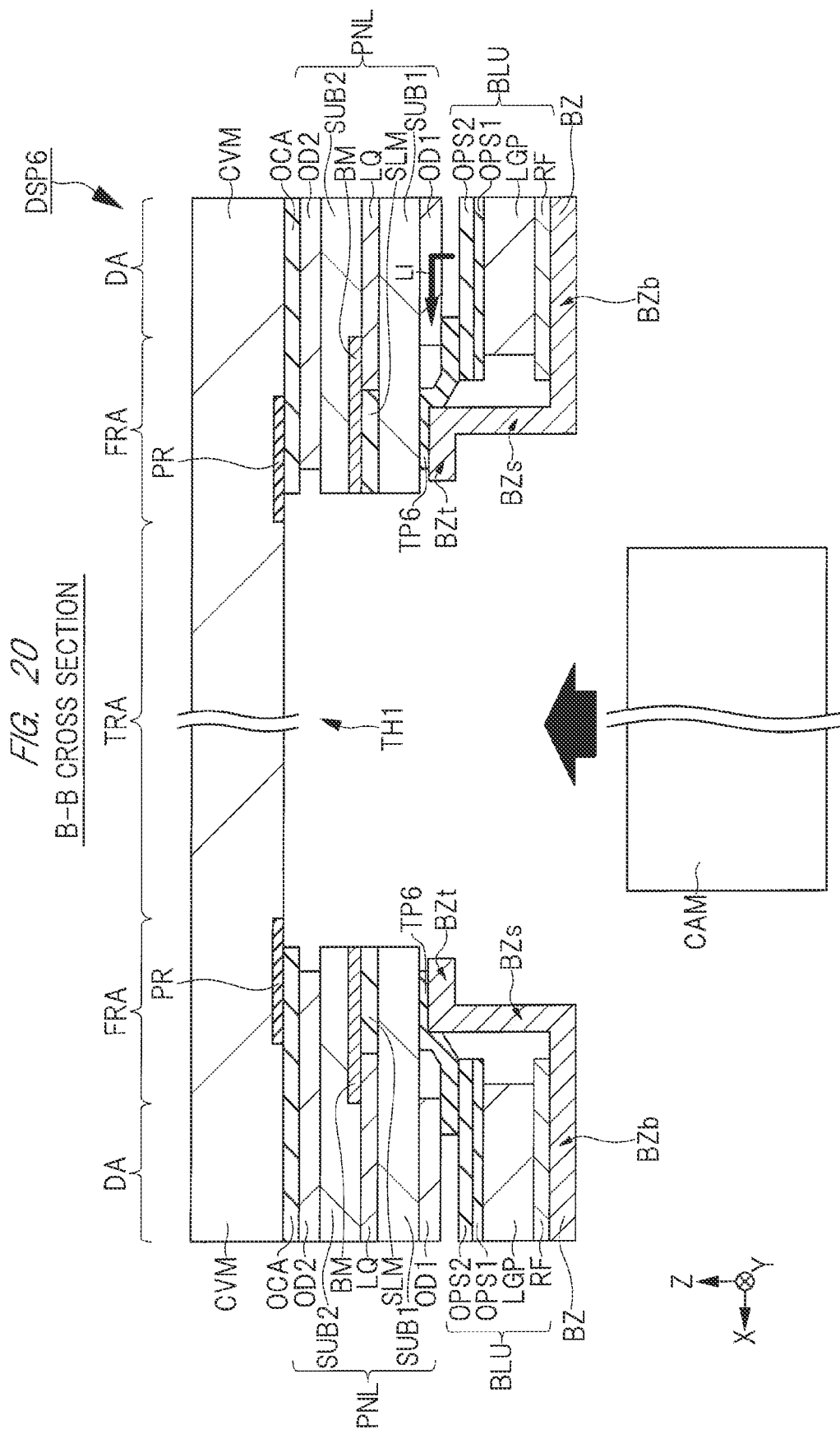
FIG. 20 is a cross-sectional view showing a peripheral structure of a transparent region according to a sixth modification.

As shown in FIG. 20, the side surface of the polarizing plate OD1 in the panel PNL is located at a position closer to the display region DA than the side portion BZs of the bezel BZ in the sixth modification. In the space where the polarizing plate OD1 is retreated, the bezel BZ is extended and the upper portion BZt of the bezel BZ and the adhesive layer TP6 are provided. Therefore, the side surface of the polarizing plate OD1 is covered with the bezel BZ and the adhesive layer TP6. Note that the adhesive layer TP6 according to the sixth modification may have a function of blocking the visible light.

As described in the first embodiment, the light leaking from the backlight unit BLU contains the light LI propagating inside the polarizing plate OD1 in some cases, and the light LI is likely to propagate up to the side surface of the polarizing plate OD1. On the other hand, the bezel BZ has a function of blocking the visible light.

Therefore, the side surface of the polarizing plate OD1 is covered with the bezel BZ, so that it is possible to prevent the light LI from leaking to the camera module CAM. Also, when the adhesive layer TP6 also has a function of blocking the visible light, the light leakage mentioned above can be further prevented. Namely, in the sixth modification, the light leakage mentioned above can be further prevented as compared with the sixth embodiment.

Seventh Embodiment

Hereinafter, a display device DSP7 which is an electro-optical device according to a seventh embodiment will be described with reference to FIG. 21. Note that the difference between the seventh embodiment and the sixth embodiment will be mainly described below.

Figure 21:
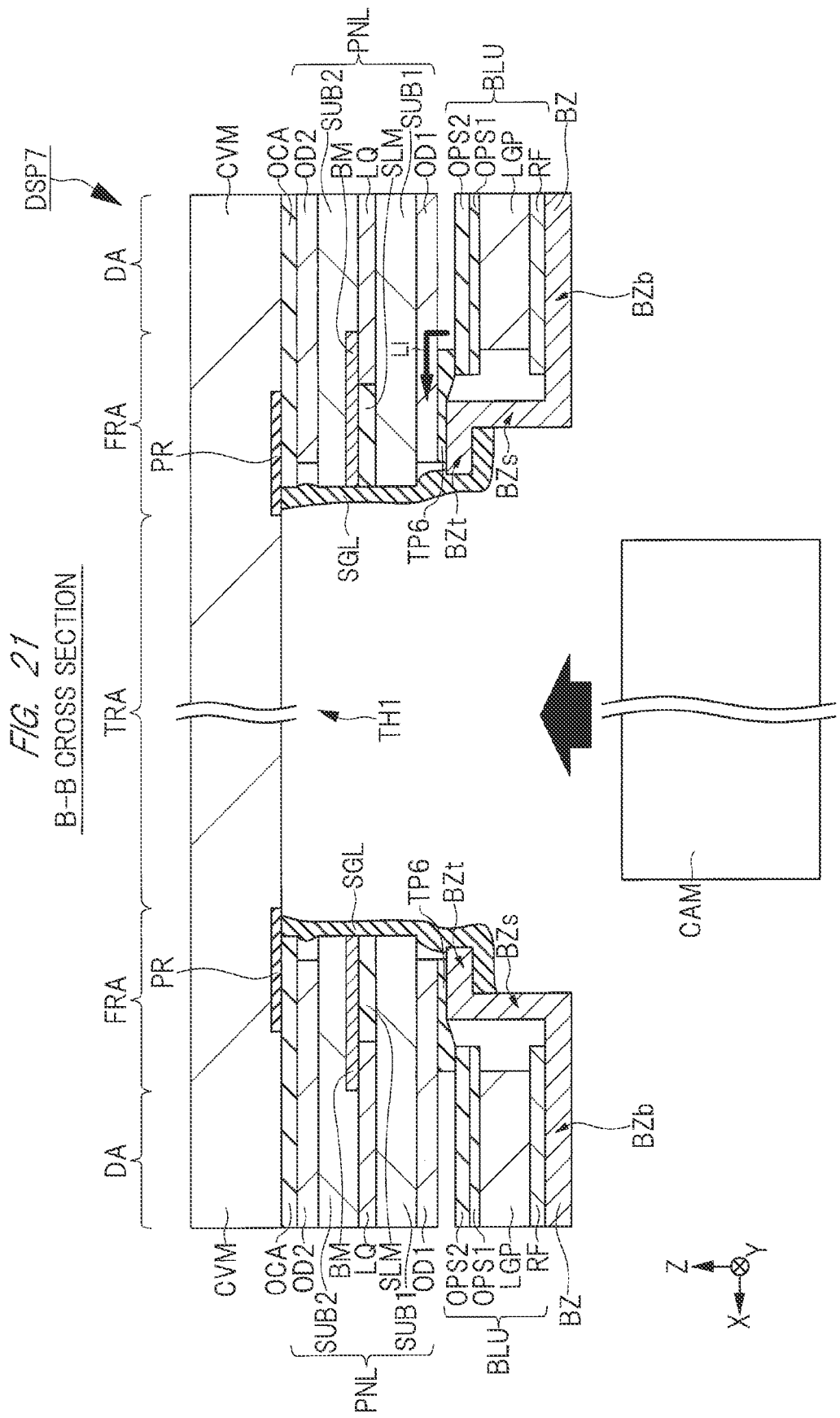
FIG. 21 is a cross-sectional view showing a peripheral structure of a transparent region according to a seventh embodiment.

As shown in FIG. 21, in the seventh embodiment, an adhesive layer (side glue) SGL is provided from the bezel BZ to the cover member CVM so as to cover the lateral side of the panel PNL. Specifically, in the frame region FRA, the adhesive layer SGL is bonded to each of the bezel BZ and the cover member CVM so as to cover each lateral side of the upper portion BZt of the bezel BZ, the adhesive layer TP6, and the panel PNL. The adhesive layer SGL can be injected to the frame region FRA by using, for example, a glue gun, preferably has a function of blocking the visible light, and is preferably made of, for example, an adhesive mixed with a black dye.

The sixth embodiment is superior to the seventh embodiment in terms of reducing the width of the frame region FRA and suppressing the number of manufacturing processes for forming the adhesive layer SGL. However, since the side surface of the polarizing plate OD1 through which the light LI is likely to propagate is covered with the adhesive layer SGL in the seventh embodiment, the light leakage to the camera module CAM can be further suppressed as compared with the sixth embodiment.

(Seventh Modification)

A seventh modification of the seventh embodiment will be described below with reference to FIG. 22. The technology related to the sixth modification is used in the seventh modification.

Figure 22:
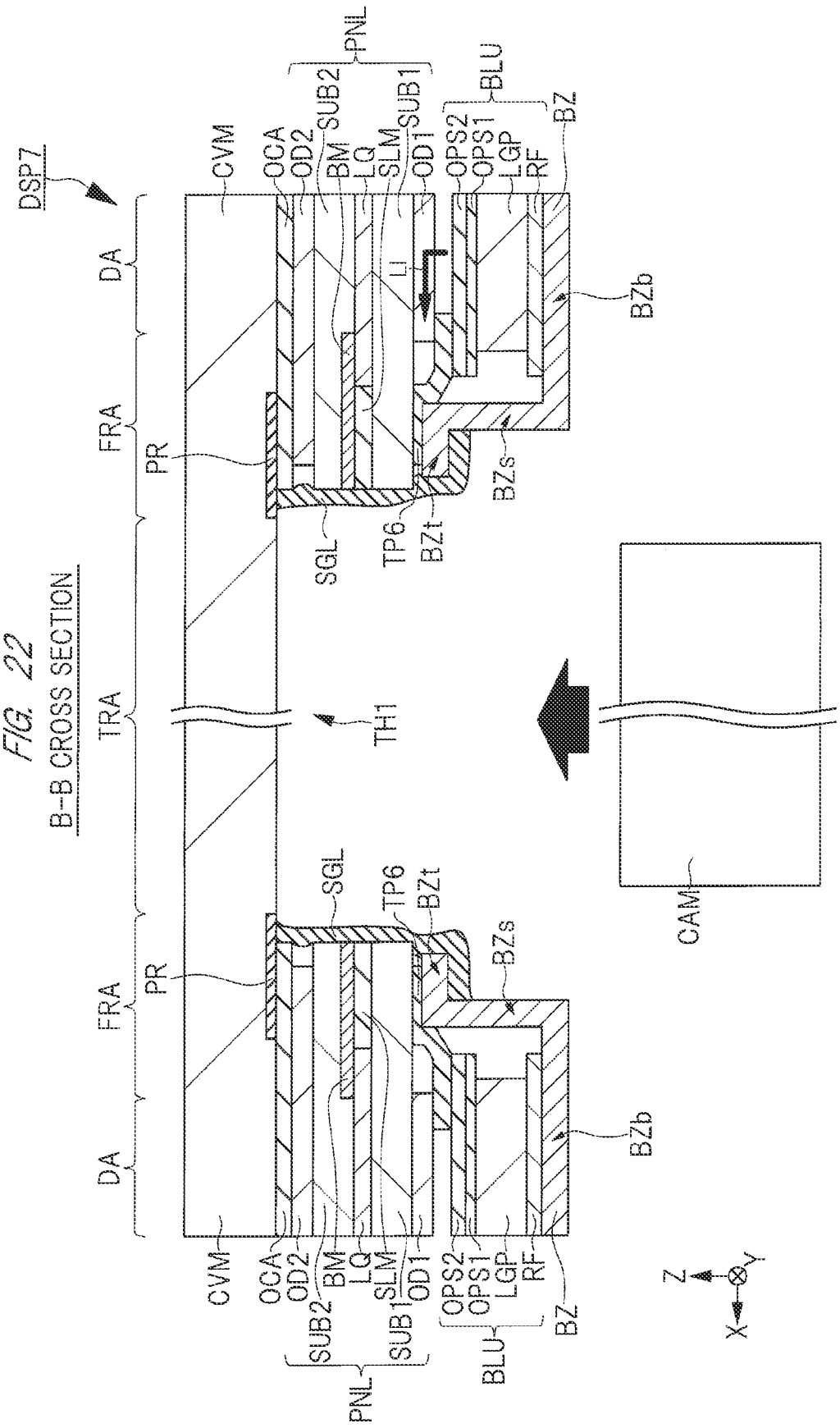
FIG. 22 is a cross-sectional view showing a peripheral structure of a transparent region according to a seventh modification.

As shown in FIG. 22, in the seventh modification, the adhesive layer SGL is provided from the bezel BZ to the cover member CVM so as to cover the lateral side of the panel PNL as in the seventh embodiment.

Also, in the seventh modification, the side surface of the polarizing plate OD1 in the panel PNL is located at a position closer to the display region DA than the side portion BZs of the bezel BZ. Namely, the upper portion BZt of the bezel BZ, the substrate SUB1, and the prism sheet (optical sheet) OPS2 are bonded to each other by the adhesive layer TP6. Therefore, the side surface of the polarizing plate OD1 is covered with the bezel BZ and the adhesive layer TP6. Note that the adhesive layer TP6 in the seventh modification may also have a function of blocking the visible light.

Therefore, since the side surface of the polarizing plate OD1 through which the light LI is likely to propagate is covered with the bezel BZ, the adhesive layer TP6, and the adhesive layer SGL in the seventh modification, the light leakage to the camera module CAM can be further suppressed as compared with the seventh embodiment.

Eighth Embodiment

Figure 23:
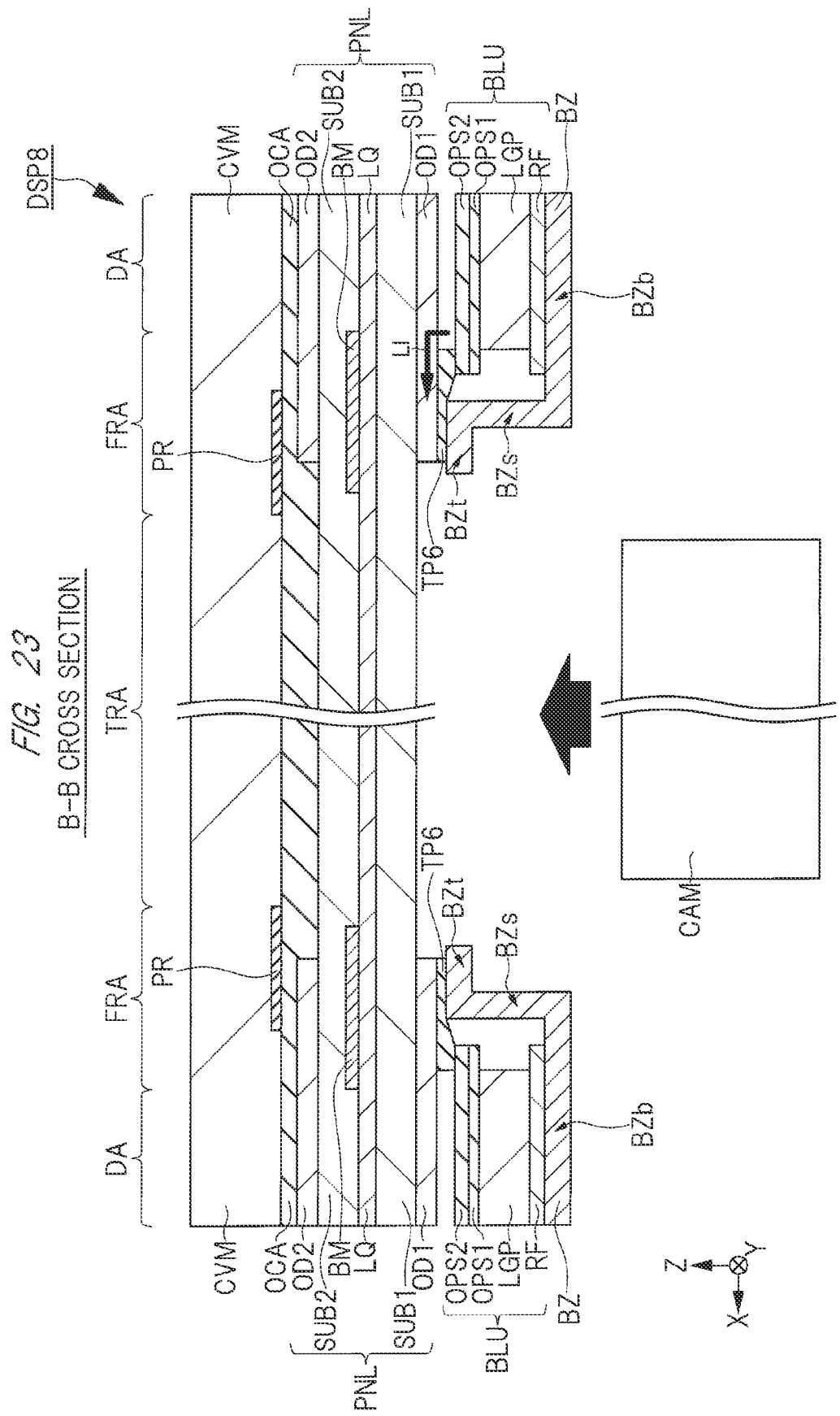
FIG. 23 is a cross-sectional view showing a peripheral structure of a transparent region according to an eighth embodiment.

Hereinafter, a display device DSP8 which is an electro-optical device according to an eighth embodiment will be described with reference to FIG. 23. Note that the difference between the eighth embodiment and the sixth embodiment will be mainly described below.

In the eighth embodiment, the hole TH1 is not formed in the panel PNL in the transparent region TRA, and a structural component made of a material that can transmit the visible light is formed. For example, the panel PNL in the transparent region TRA includes some or all of structural components such as the support substrate 10, the insulating films 11 to 15, the common electrode CE, the pixel electrode PE, the alignment film AL1, the alignment film AL2, the planarization film PZ, the barrier film BR, and the support substrate 20. Therefore, the light from outside of the display device DP8 can enter the camera module CAM.

Since the hole TH1 is not formed in the panel PNL in the transparent region TRA, the strength of the display device DSP8 in the periphery of the transparent region TRA can be increased in the eighth embodiment in addition to the effect of the sixth embodiment.

Also, since the height of the side portion BZs of the bezel BZ can be reduced in the eighth embodiment, the manufacturing process for forming the side portion BZs by processing the bezel BZ can be facilitated as compared with the sixth embodiment.

(Eighth Modification)

An eighth modification of the eighth embodiment will be described below with reference to FIG. 24. The technology related to the sixth modification and the seventh modification is used in the eighth modification.

Figure 24:
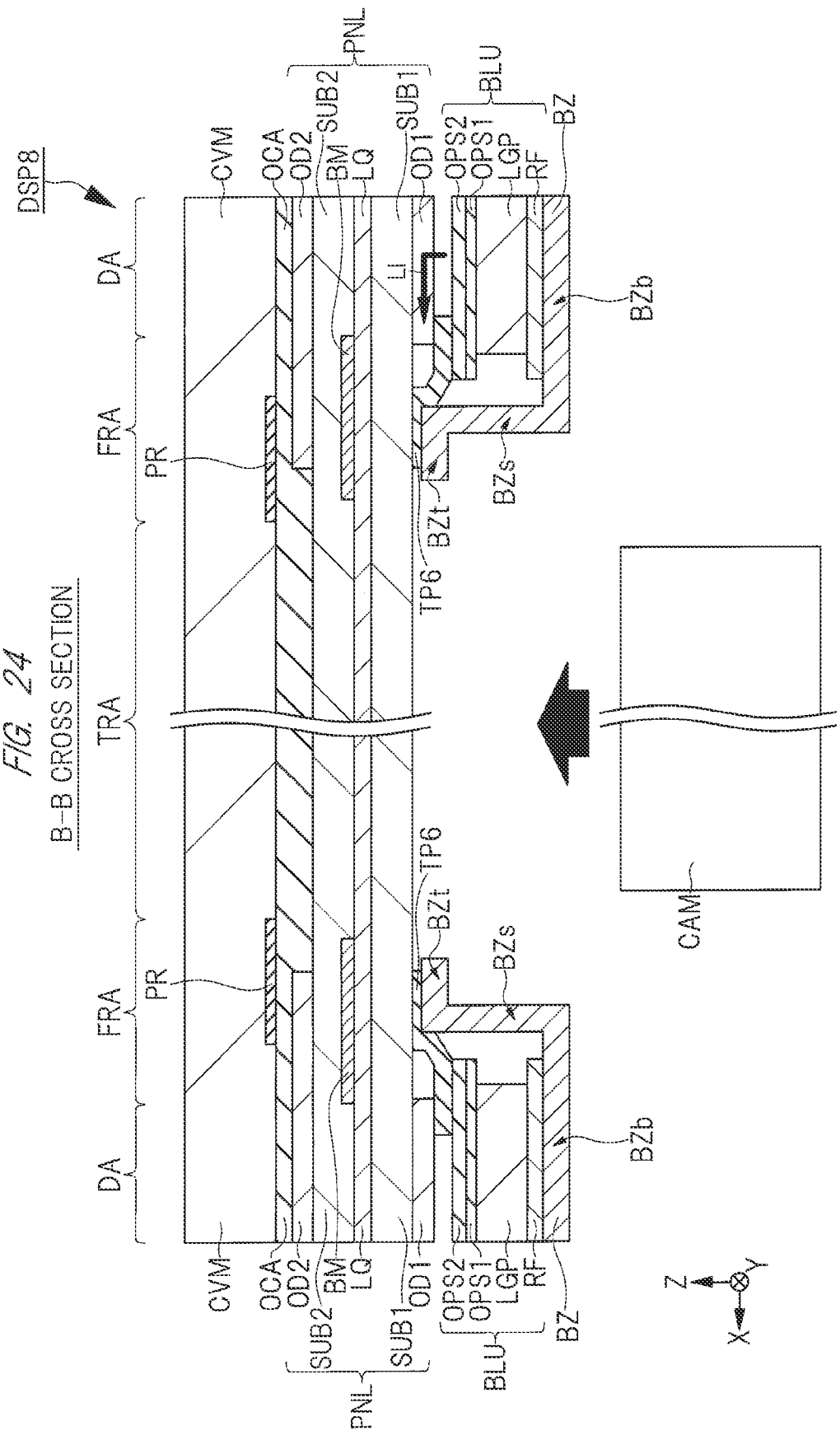
FIG. 24 is a cross-sectional view showing a peripheral structure of a transparent region according to an eighth modification.

As shown in FIG. 24, in the eighth modification, the side surface of the polarizing plate OD1 in the panel PNL is located at a position closer to the display region DA than the side portion BZs of the bezel BZ. Namely, the upper portion BZt of the bezel BZ, the substrate SUB1, and the prism sheet (optical sheet) OPS2 are bonded to each other by the adhesive layer TP6. Therefore, the side surface of the polarizing plate OD1 is covered with the bezel BZ and the adhesive layer TP6. Note that the adhesive layer TP6 in the eighth modification may also have a function of blocking the visible light.

Therefore, since the side surface of the polarizing plate OD1 through which the light LI is likely to propagate is covered with the bezel BZ, the adhesive layer TP6, and the adhesive layer SGL in the eighth modification, the light leakage to the camera module CAM can be further suppressed as compared with the eighth embodiment.

Ninth Embodiment

Hereinafter, a display device DSP9 which is an electro-optical device according to a ninth embodiment will be described with reference to FIG. 25. Note that the difference between the ninth embodiment and the eighth embodiment will be mainly described below.

Figure 25:
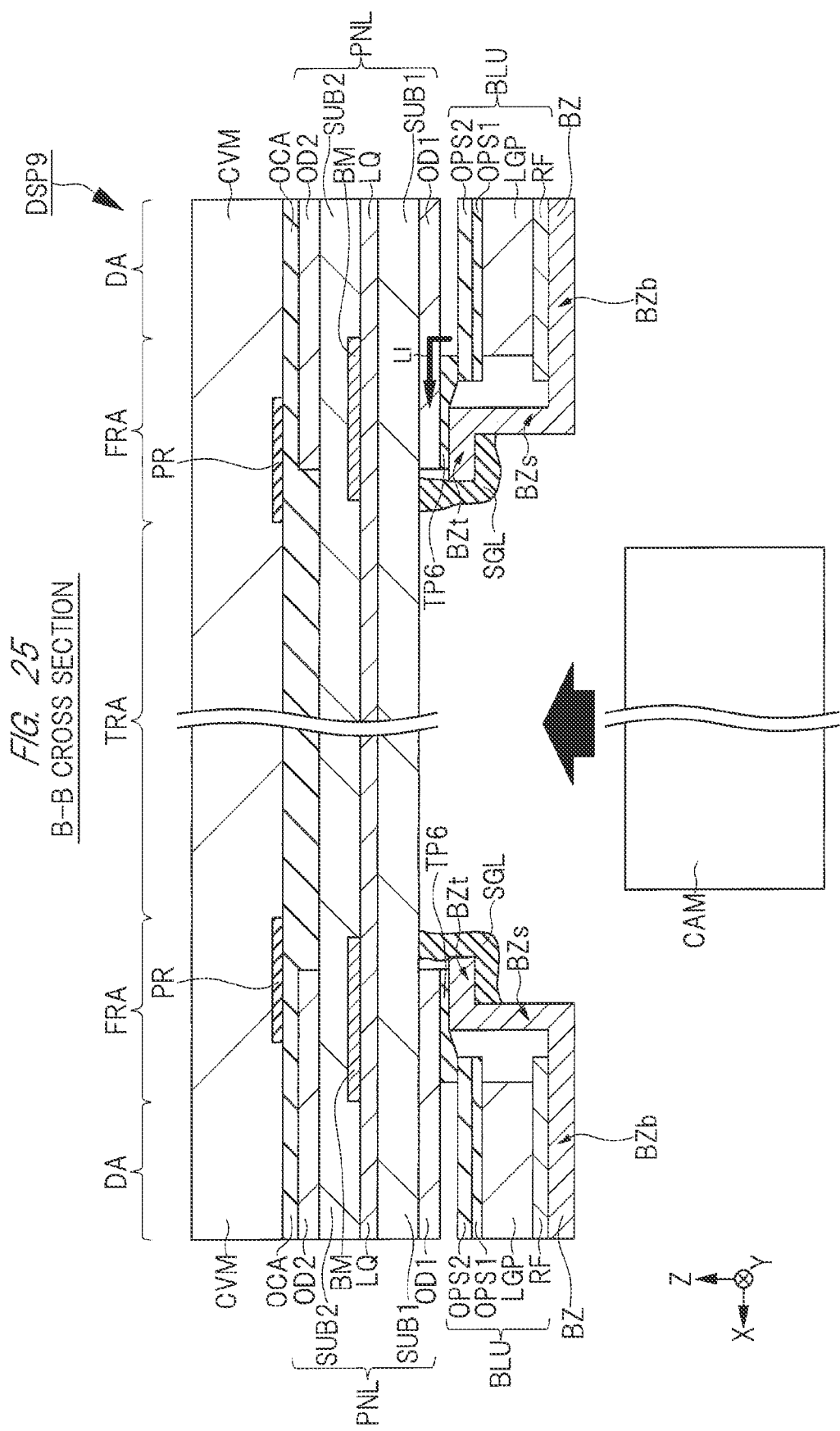
FIG. 25 is a cross-sectional view showing a peripheral structure of a transparent region according to a ninth embodiment.

As shown in FIG. 25, in the ninth embodiment, the hole TH1 is not formed in the panel PNL in the transparent region TRA, and a structural component made of a material that can transmit the visible light is formed as in the eighth embodiment. Therefore, in the ninth embodiment, the light from outside of the display device DP9 can enter the camera module CAM as in the eighth embodiment. Also, the strength of the display device DSP9 in the periphery of the transparent region TRA can be increased, and the manufacturing process for forming the side portion BZs of the bezel BZ is facilitated.

Also, the adhesive layer SGL is provided from the bezel BZ to the cover member CVM so as to cover the lateral side of the polarizing plate OD1 in the panel PNL. Since the side surface of the polarizing plate OD1 through which the light LI is likely to propagate is covered with the adhesive layer SGL in the ninth embodiment, the light leakage to the camera module CAM can be further suppressed as compared with the eighth embodiment.

(Ninth Modification)

A ninth modification of the ninth embodiment will be described below with reference to FIG. 26. The technology related to the sixth to eighth modifications is used in the ninth modification.

Figure 26:
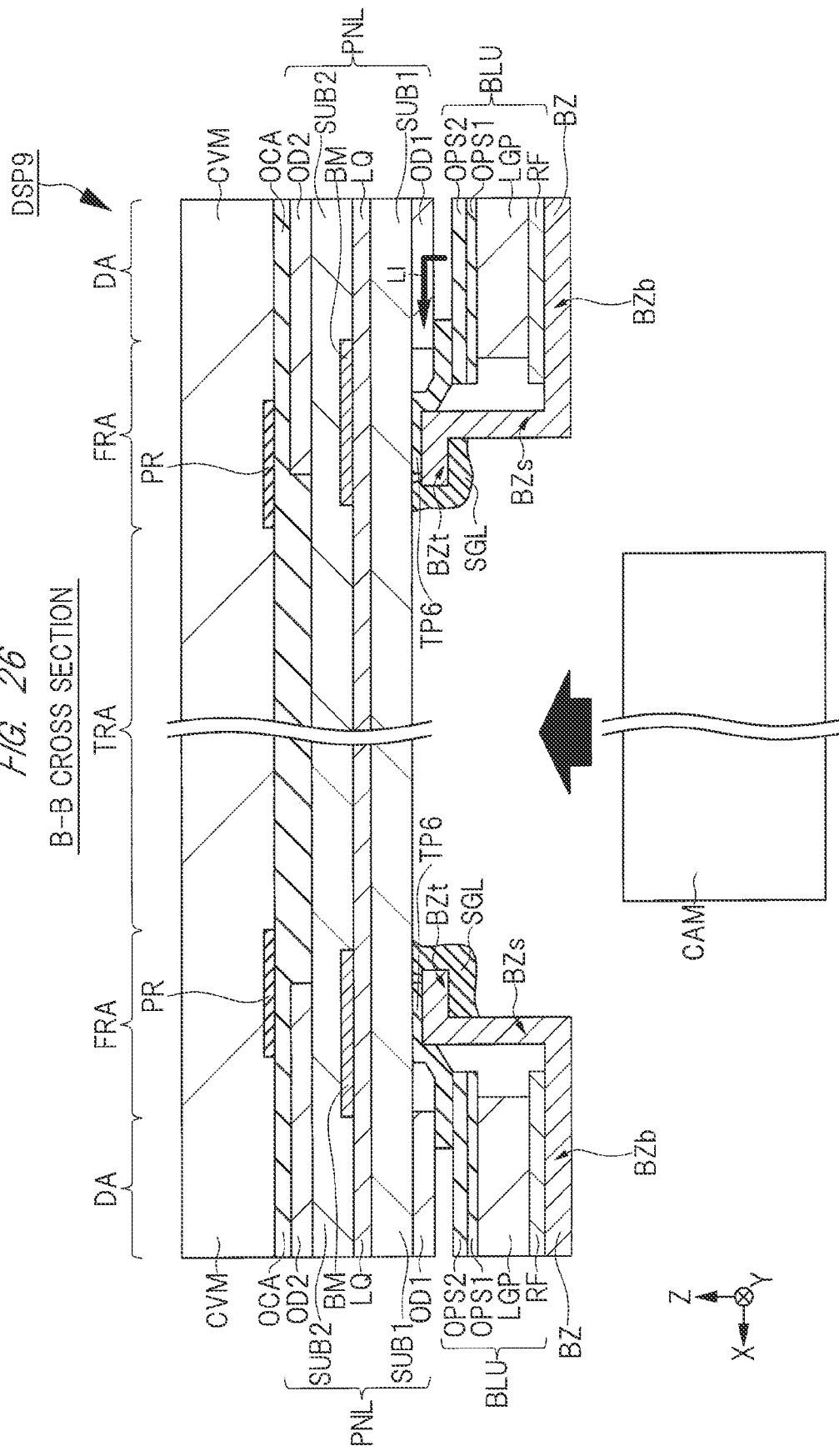
FIG. 26 is a cross-sectional view showing a peripheral structure of a transparent region according to a ninth modification.

As shown in FIG. 26, in the ninth modification, the adhesive layer SGL is provided from the bezel BZ to the cover member CVM so as to cover the lateral side of the polarizing plate OD1 in the panel PNL as in the ninth embodiment. Also, the side surface of the polarizing plate OD1 in the panel PNL is located at a position closer to the display region DA1 than the side portion BZs of the bezel BZ.

Therefore, since the side surface of the polarizing plate OD1 through which the light LI is likely to propagate is covered with the bezel BZ, the adhesive layer TP6, and the adhesive layer SGL in the ninth modification, the light leakage to the camera module CAM can be further suppressed as compared with the ninth embodiment.

A person having ordinary skill in the art can make various modifications and corrections within a scope of the idea of the present invention, and it is interpreted that the modifications and the corrections also belong to the scope of the present invention. For example, the embodiments obtained by performing addition or elimination of components or design change or the embodiments obtained by performing addition or reduction of process or condition change to the embodiments described above by a person having an ordinary skill in the art are also included in the scope of the present invention as long as they include the gist of the present invention.

In addition, a part of contents described in the embodiments above are described below.

[Appendix 1]

An electro-optical device comprising:

a panel including a first substrate, a second substrate provided above the first substrate, and an electro-optical layer formed between the first substrate and the second substrate, the panel having a display region;

a transparent region provided inside the display region in a plan view;

a frame region provided between the transparent region and the display region in a plan view;

a cover member provided above the second substrate of the panel so as to overlap with the transparent region in a plan view;

a backlight unit provided below the first substrate of the panel so as not to overlap with the transparent region in a plan view; and a bezel provided below the backlight unit so as not to overlap with the transparent region in a plan view, wherein the bezel includes a bottom portion configured to cover a lower side of the backlight unit, a side portion provided on a lateral side of the backlight unit in the frame region, and an upper portion bonded to the panel via a first adhesive layer in the frame region, and a width of the upper portion of the bezel is larger than a width of the side portion of the bezel in a plan view.

[Appendix 2]

The electro-optical device described in the appendix 1, wherein the panel further includes a polarizing plate formed below the first substrate in the display region and the frame region, the backlight unit includes a reflection film provided over the bottom portion of the bezel, a light guide layer formed over the reflection film and capable of transmitting light, and an optical sheet formed over the light guide layer, and the polarizing plate, the upper portion of the bezel, and the optical sheet are bonded by the first adhesive layer.

[Appendix 3]

The electro-optical device described in the appendix 1, wherein the panel further includes a polarizing plate formed below the first substrate in the display region and the frame region, the backlight unit includes a reflection film provided over the bottom portion of the bezel, a light guide layer formed over the reflection film and capable of transmitting light, and an optical sheet formed over the light guide layer, a side surface of the polarizing plate is located at a position closer to the display region than the side portion of the bezel, and the first substrate, the upper portion of the bezel, and the optical sheet are bonded by the first adhesive layer.

[Appendix 4]

The electro-optical device described in any one of the appendices 1 to 3, wherein the first substrate, the second substrate, and the electro-optical layer are provided also in the frame region and the transparent region, and a light-blocking film is formed between the first substrate and the second substrate in the frame region.

[Appendix 5]

The electro-optical device described in any one of the appendices 1 to 4, further comprising a second adhesive layer bonded to each of the bezel and the first substrate so as to cover each lateral side of the upper portion of the bezel and the first adhesive layer in the frame region.

[Appendix 6]

The electro-optical device described in any one of the appendices 1 to 3, wherein a hole is formed in the panel so as to penetrate the first substrate, the electro-optical layer, and the second substrate in a part of the frame region and the transparent region, and a light-blocking film is formed between the first substrate and the second substrate in the frame region.

[Appendix 7]

The electro-optical device described in the appendix 6, wherein the cover member is provided above the panel having the hole, the electro-optical device further comprising a third adhesive layer bonded to each of the bezel and the cover member so as to cover each lateral side of the upper portion of the bezel, the first adhesive layer, and the panel in the frame region.

[Appendix 8]

The electro-optical device described in any one of the appendices 1 to 7, wherein the bezel is made of a metal material.

[Appendix 9]

The electro-optical device described in any one of the appendices 1 to 8, wherein the electro-optical layer is a liquid crystal layer, the first substrate includes a plurality of transistors in the display region, and the second substrate includes a plurality of color filters in the display region.

The present invention can be applied to an electro-optical device such as a display device or an electronic equipment in which an electro-optical device is incorporated.

What is claimed is:

1. An electro-optical device comprising:
a camera module;
a panel including a first substrate, a second substrate provided above the first substrate, and an electro-optical layer formed between the first substrate and the second substrate, the panel including a display region;
a transparent region provided inside the display region in a plan view;
a frame region provided between the transparent region and the display region in the plan view;
a backlight unit provided below the first substrate of the panel so as not to overlap with the transparent region in the plan view;
a bezel provided below the backlight unit so as not to overlap with the transparent region in the plan view; and
a cap configured to cover at least a lateral side of the backlight unit in the frame region and made of a material different from that of the bezel,
wherein the bezel includes a bottom portion configured to cover a lower side of the backlight unit and a side portion provided on the lateral side of the backlight unit in the frame region and provided between the backlight unit and the cap,
in the transparent region, a region on the lateral side of the backlight unit via the cap is a region in which the camera module is mounted,
the cap is located between the camera module and the side portion of the bezel,
the first substrate, the second substrate, and the electro-optical layer are provided also in the frame region and the transparent region,
a light-blocking film is formed between the first substrate and the second substrate in the frame region,
the panel further includes a polarizing plate formed below the first substrate in the display region and the frame region so as not to overlap with the transparent region,
the cap includes a side portion configured to cover the side portion of the bezel, and an upper portion bonded to the polarizing plate via a first adhesive layer,
the upper portion of the cap overlaps the polarizing plate in the plan view, and
a width of the upper portion of the cap is larger than a width of the side portion of the cap in the plan view.

2. The electro-optical device according to claim 1,
wherein the bezel is made of a metal material, and
the cap is made of a resin material having a function of blocking visible light.

3. The electro-optical device according to claim 2,
wherein the electro-optical layer is a liquid crystal layer,
the first substrate includes a plurality of transistors in the display region, and
the second substrate includes a plurality of color filters in the display region, and the light-blocking film.

4. The electro-optical device according to claim 3,
wherein the cap is made of a material softer than the bezel.

5. The electro-optical device according to claim 4,
wherein the upper portion of the cap extends to a direction from the side portion of the cap toward the transparent region.

6. An electro-optical device comprising:
a camera module;
a panel including a first substrate, a second substrate provided above the first substrate, and an electro-optical layer formed between the first substrate and the second substrate;

a polarizing plate on the first substrate;

an opening formed in the polarizing plate;

a backlight unit provided below the polarizing plate so as not to overlap with the opening of the polarizing plate in a plan view;

a bezel provided below the backlight unit so as not to overlap with the opening of the polarizing plate in the plan view; and a cap configured to cover at least a lateral side of the backlight unit around the opening of the polarizing plate and made of a material different from that of the bezel, wherein the opening of the polarizing plate overlaps the camera module, the bezel includes a bottom portion configured to cover a lower side of the backlight unit and a side portion provided on the lateral side of the backlight unit around the opening of the polarizing plate and provided between the backlight unit and the cap, the camera module is mounted inside of the cap and is overlapping the opening of the polarizing plate, the cap is located between the camera module and the side portion of the bezel, the electro-optical layer overlaps the opening of the polarizing plate, a part of the first substrate is exposed from the polarizing plate in the opening of the polarizing plate, where the opening of the polarizing plate is located, the cap includes a side portion configured to cover the side portion of the bezel, and an upper portion bonded to the polarizing plate via an adhesive layer, the upper portion of the cap overlaps the polarizing plate around the opening of the polarizing plate in the plan view, and a width of the upper portion of the cap is larger than a width of the side portion of the cap in the plan view.

7. The electro-optical device according to claim 6, wherein a top of the side portion of the bezel is not contact with the polarizing plate.

8. The electro-optical device according to claim 7, wherein the second substrate has a light-blocking film around the opening of the polarizing plate, each of the lateral side of the backlight unit, the side portion of the bezel, and the upper portion of the cap overlap the light-blocking film.

9. The electro-optical device according to claim 6, wherein the adhesive layer is an adhesive tape.

10. The electro-optical device according to claim 6, wherein the bezel is made of a metal material, and the cap is made of a resin material having a function of blocking visible light.

11. The electro-optical device according to claim 10, wherein the cap is made of a material softer than the bezel.

12. The electro-optical device according to claim 11, wherein the upper portion of the cap extends to a direction from the side portion of the cap toward an edge of the opening of the polarizing plate.

\* \* \* \* \*